United States Patent [19]
Rosheim

[11] Patent Number: 4,804,220
[45] Date of Patent: Feb. 14, 1989

[54] WRIST TENDON ACTUATOR

[76] Inventor: Mark E. Rosheim, 1565 St. Paul Ave., St. Paul, Minn. 55116

[21] Appl. No.: 16,943

[22] Filed: Feb. 20, 1987

Related U.S. Application Data

[63] Continuation-in-part of Ser. No. 820,677, Jan. 21, 1986, abandoned.

[51] Int. Cl.[4] .................. B25J 15/10; B25J 17/02; G05G 1/00
[52] U.S. Cl. .................... 294/111; 74/479; 403/57; 403/74; 403/114; 901/21; 901/29; 901/36; 901/39
[58] Field of Search ............ 294/86.4, 99.1, 106, 294/111, 112, 119.3; 74/469, 479, 665 R, 665 D, 665 L; 403/57, 74, 114, 116, 122; 414/7, 729, 732, 735, 738, 739; 623/48, 57-65; 901/2, 14, 15, 18, 19, 21, 27-31, 36-39, 41, 50

[56] References Cited

U.S. PATENT DOCUMENTS

| | | | |
|---|---|---|---|
| 1,504,121 | 8/1924 | Harris | 623/58 |
| 3,246,580 | 4/1966 | Huska | 92/120 |
| 3,405,406 | 10/1968 | Vykukal | 2/2.1 |
| 3,587,872 | 6/1971 | Pauly | 214/1 BC |
| 3,631,737 | 1/1972 | Wells | 74/469 |
| 3,694,021 | 9/1972 | Mullen | 294/106 |
| 3,739,923 | 6/1973 | Totsuka | 214/1 BC |
| 3,784,031 | 1/1974 | Niitu et al. | 214/1 BC |
| 3,912,172 | 10/1975 | Bolner | 239/265.35 |
| 3,973,469 | 8/1976 | Humen | 91/51 |
| 4,009,644 | 3/1977 | Higuchi et al. | 92/125 |
| 4,045,958 | 9/1977 | Wells | 60/325 |
| 4,046,262 | 9/1977 | Vykukal et al. | 214/1 CM |
| 4,068,536 | 1/1978 | Stackhouse | 74/417 |
| 4,073,201 | 2/1978 | Taylor et al. | 74/665 |
| 4,107,948 | 8/1978 | Molaug | 54/2 P |
| 4,194,437 | 3/1980 | Rosheim | 92/120 |
| 4,246,661 | 1/1981 | Pinson | 901/29 X |
| 4,296,681 | 10/1981 | Rosheim | 92/122 |
| 4,353,677 | 10/1982 | Susnjara et al. | 414/735 |
| 4,551,058 | 11/1985 | Mosher | 414/735 |
| 4,575,297 | 3/1986 | Richter | 414/665 |
| 4,628,765 | 12/1986 | Dien et al. | 901/18 X |
| 4,739,692 | 4/1988 | Wassam et al. | 901/29 X |

FOREIGN PATENT DOCUMENTS

| | | | |
|---|---|---|---|
| 2752236 | 7/1980 | Fed. Rep. of Germany . | |
| 1114546 | 9/1984 | U.S.S.R. | 901/28 |
| 1117203 | 10/1984 | U.S.S.R. | 901/29 |

OTHER PUBLICATIONS

"Robot Wrist Actuators," M. Rosheim; *Robotics Age*, Nov./Dec. 1982, pp. 15–22.

*Pictorial Handbook of Technical Devices*, P. Grafstein & O. Schwartz; published by Chemical Publishing Co., Inc., New York, 1971, pp. 16–17.

"The Utah/MIT Dextrous Hand: Work in Progress," S. C. Jacobsen, J. E. Wood, D. F. Knutti, K. B. Biggers; *Robot Grippers*, pp. 341–389.

*Primary Examiner*—Johnny D. Cherry
*Attorney, Agent, or Firm*—Kinney & Lange

[57] ABSTRACT

The mechanical joint includes a spherical member having a pair of grooves in its outer surface, each groove extending circumferentially about the spherical member and disposed approximately 90° from each other. A housing has a concave spherical socket for receiving the spherical member. The housing includes a pair of slots located proximately at an equatorial plane of the spherical member. A frame is fixedly secured to the spherical member at the intersection of the first and second groove opposite the housing. A first ribbon, slidable within the first groove, is attached to pivot pins in the slots of the housing and is looped around a first pulley within the frame. A second ribbon slidable within the second groove is attached to pivot pins mounted in the housing at the approximate midpoints between the slots of the housing. The second ribbon is attached to a second pulley within the housing. An output member is fixedly connected to the housing. First and second drives provide selective movement of the first and second ribbons.

70 Claims, 14 Drawing Sheets

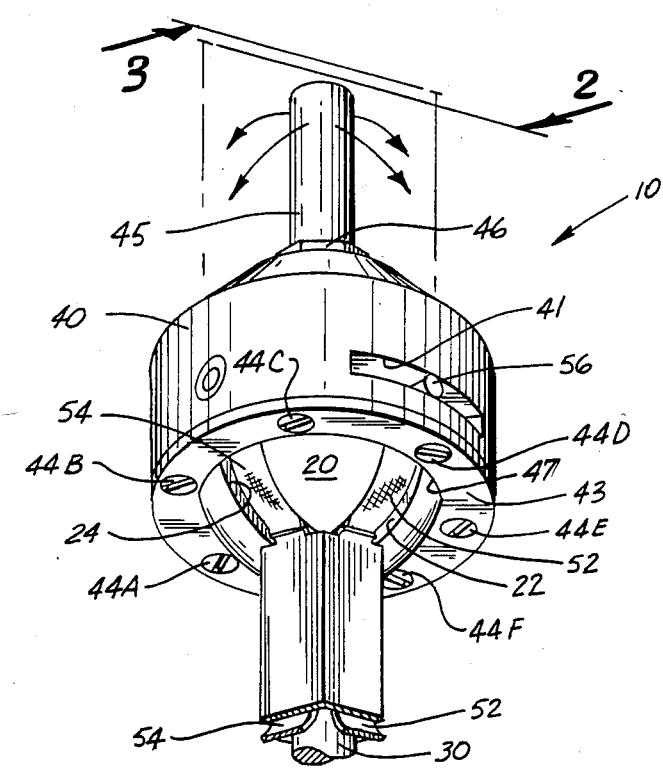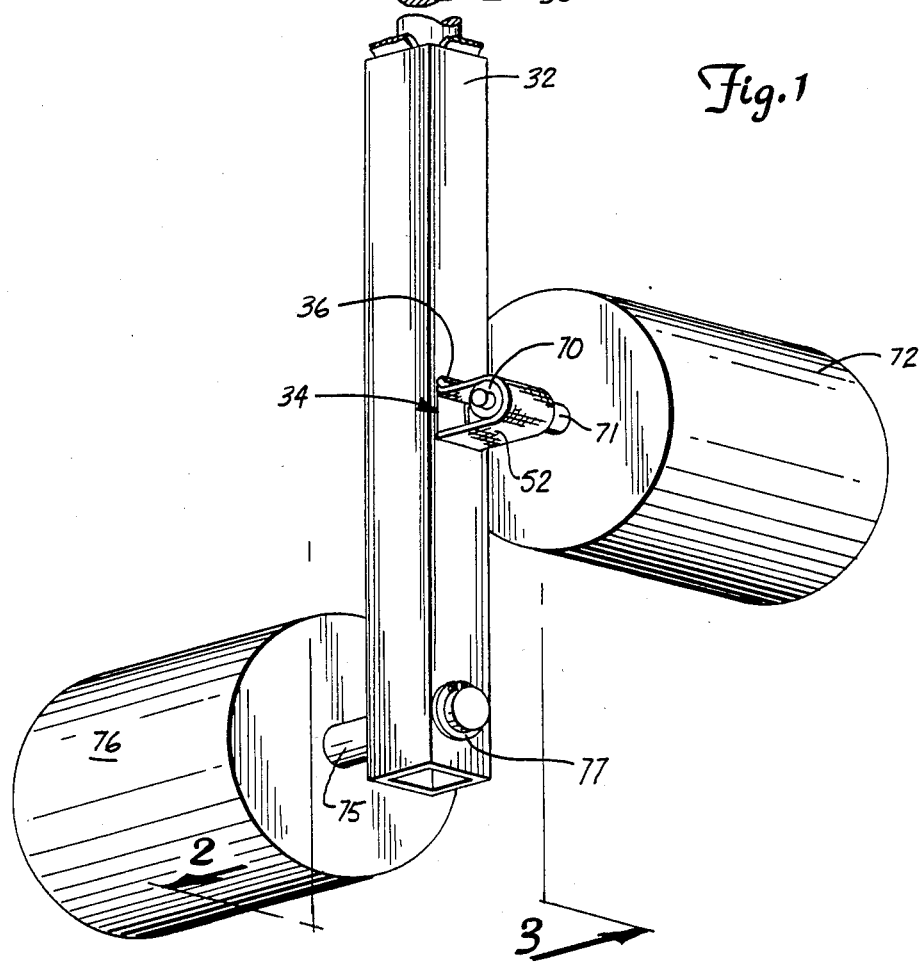
Fig.1

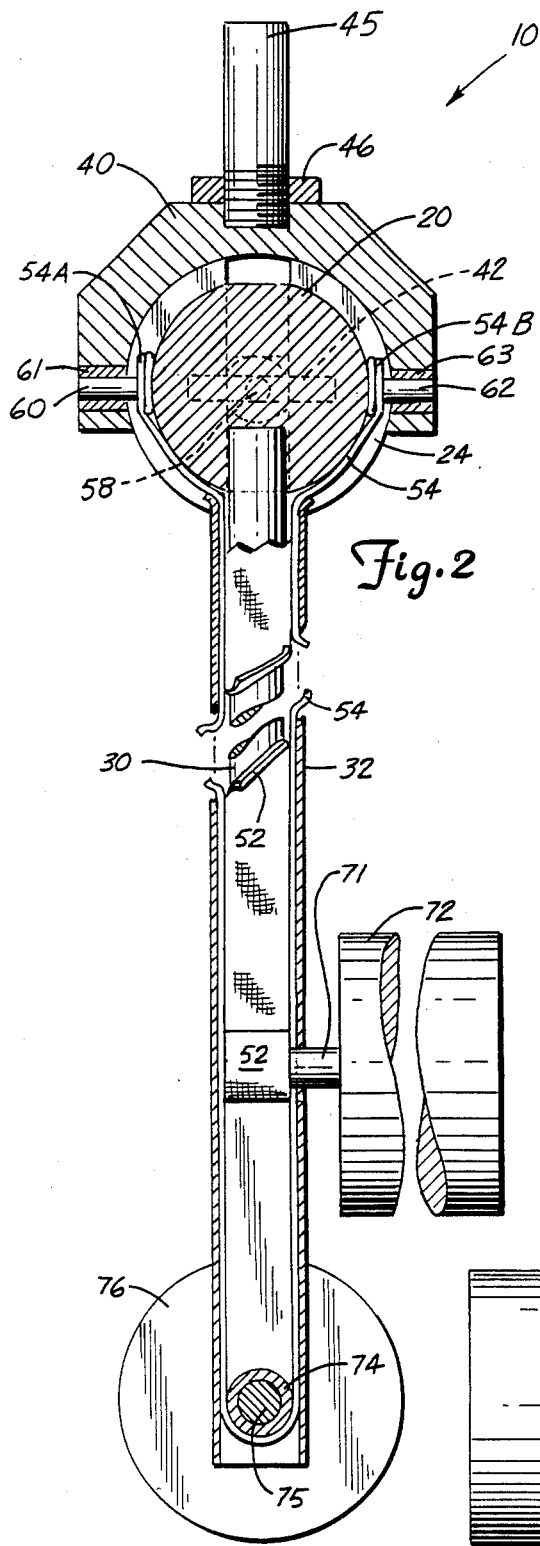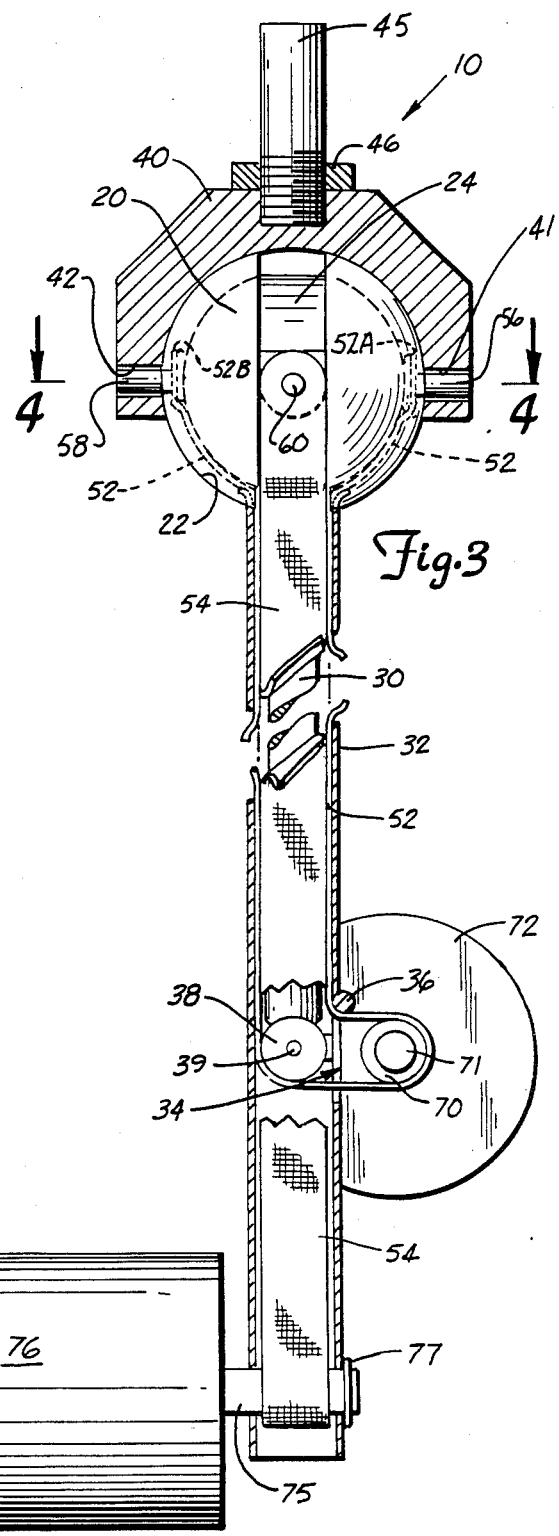

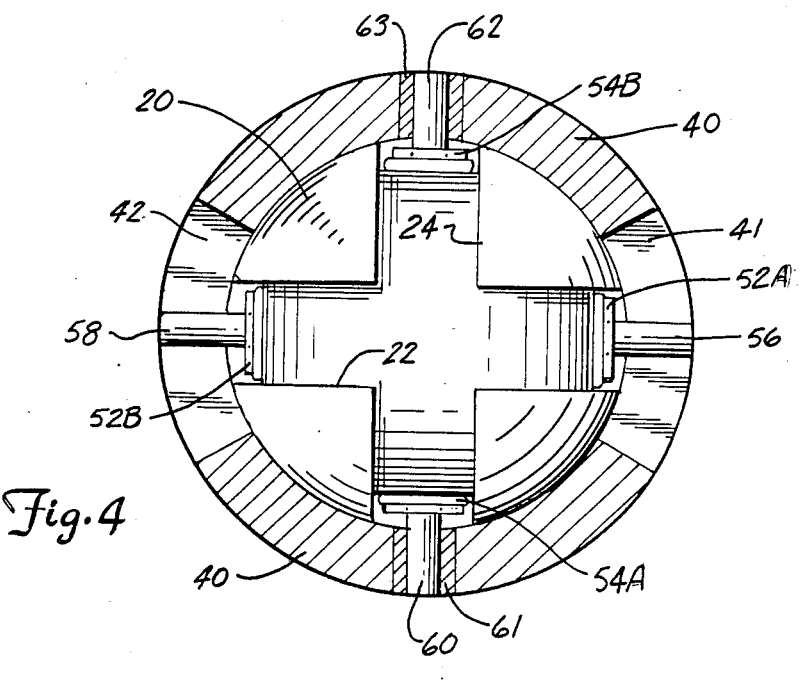
Fig. 4
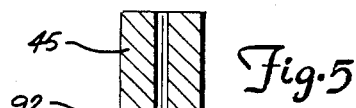
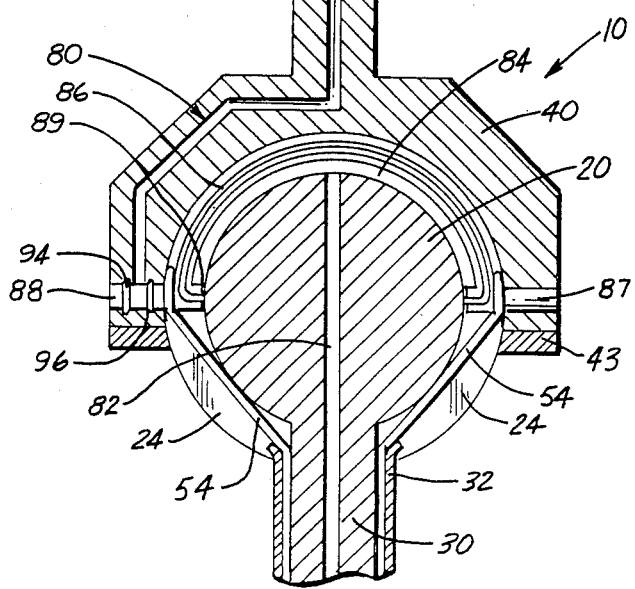
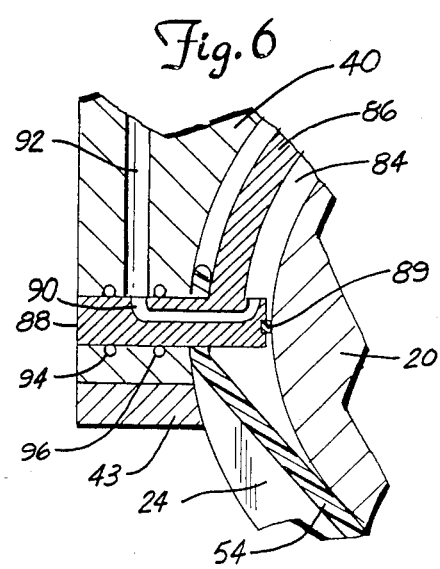
Fig. 6

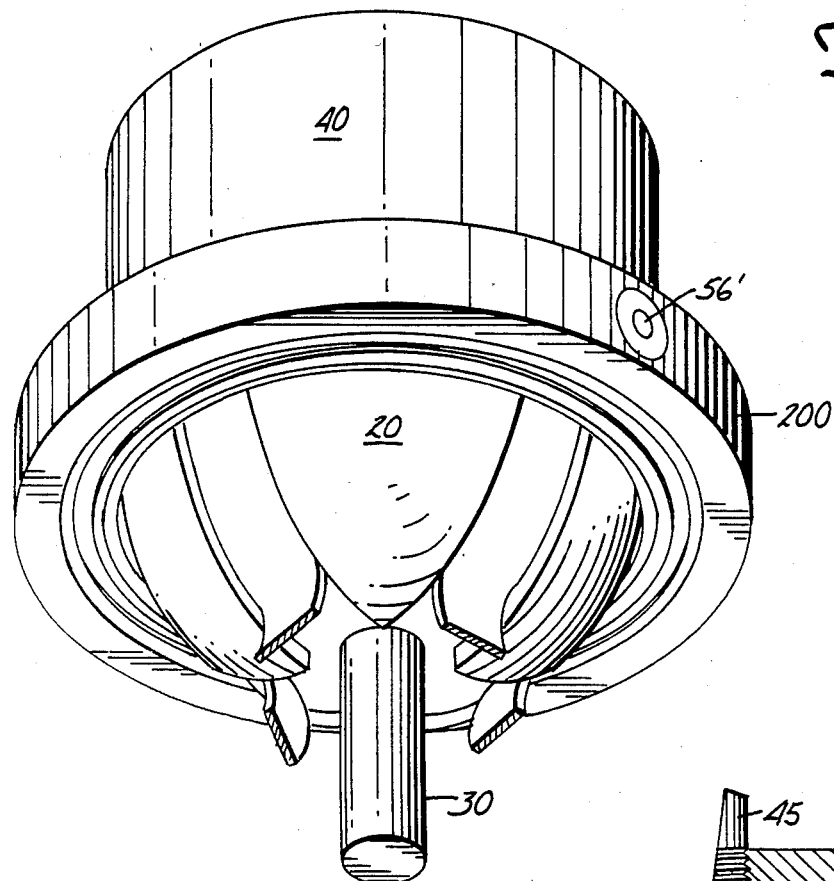
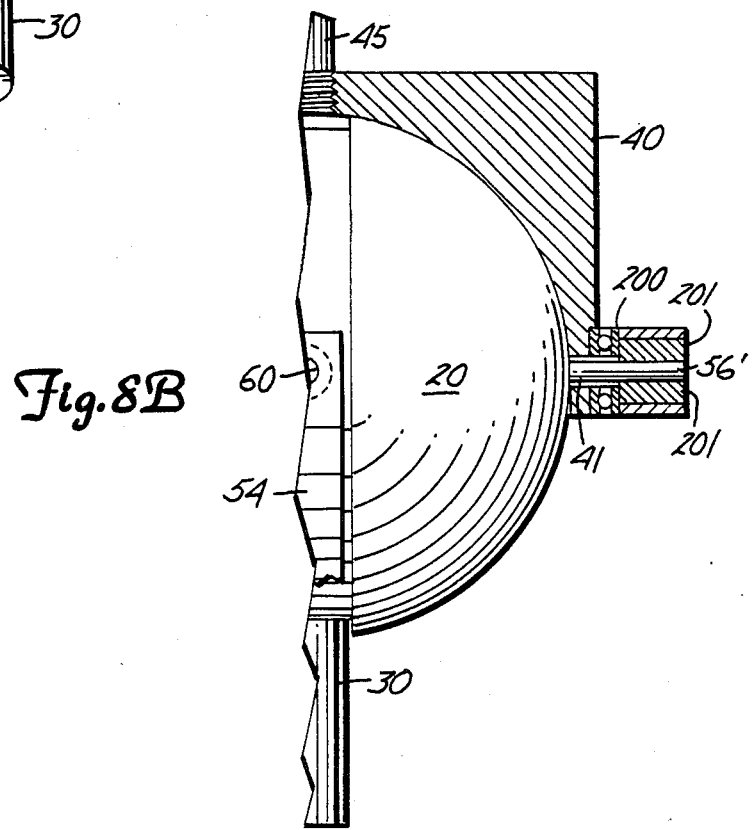

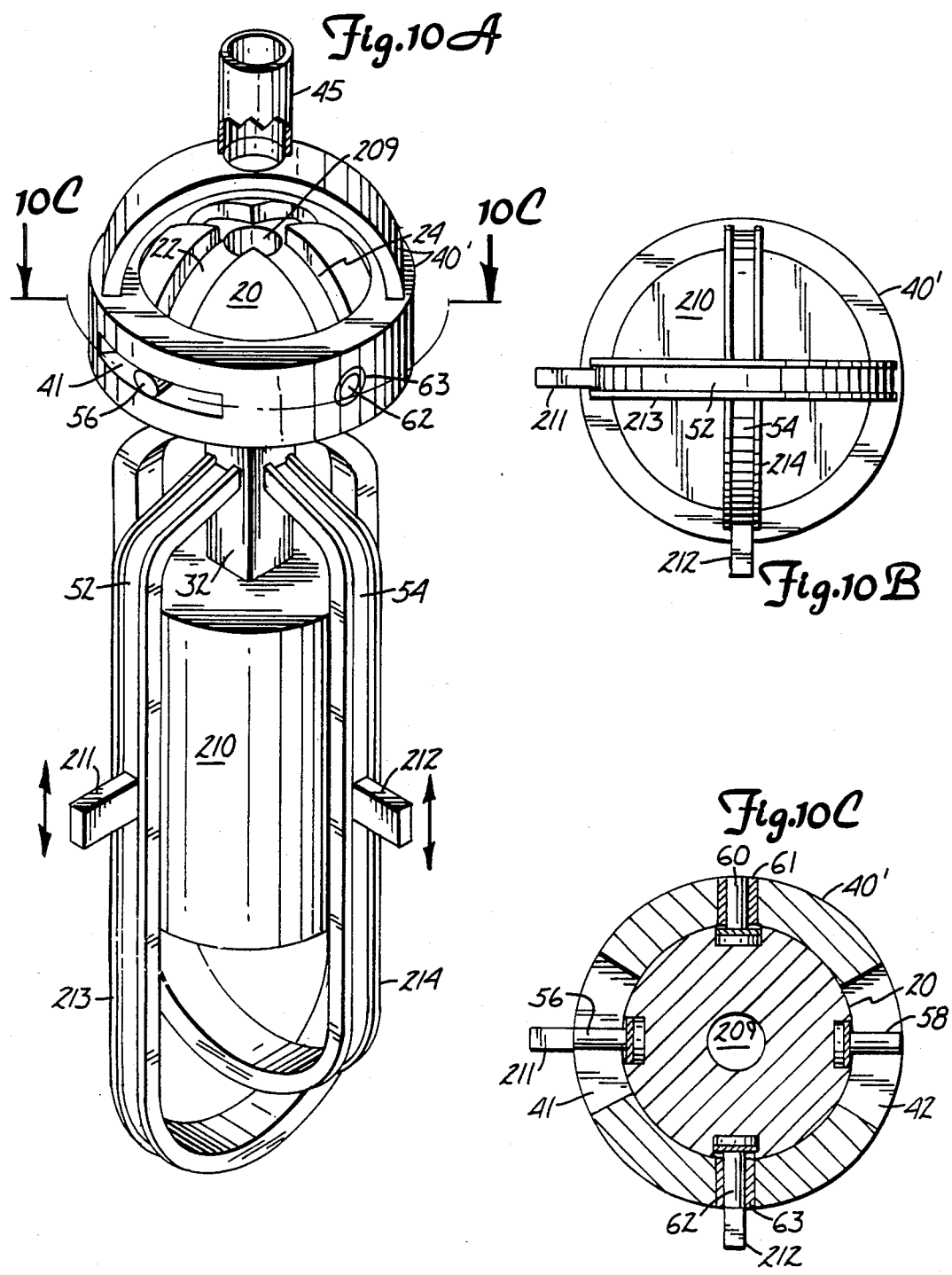

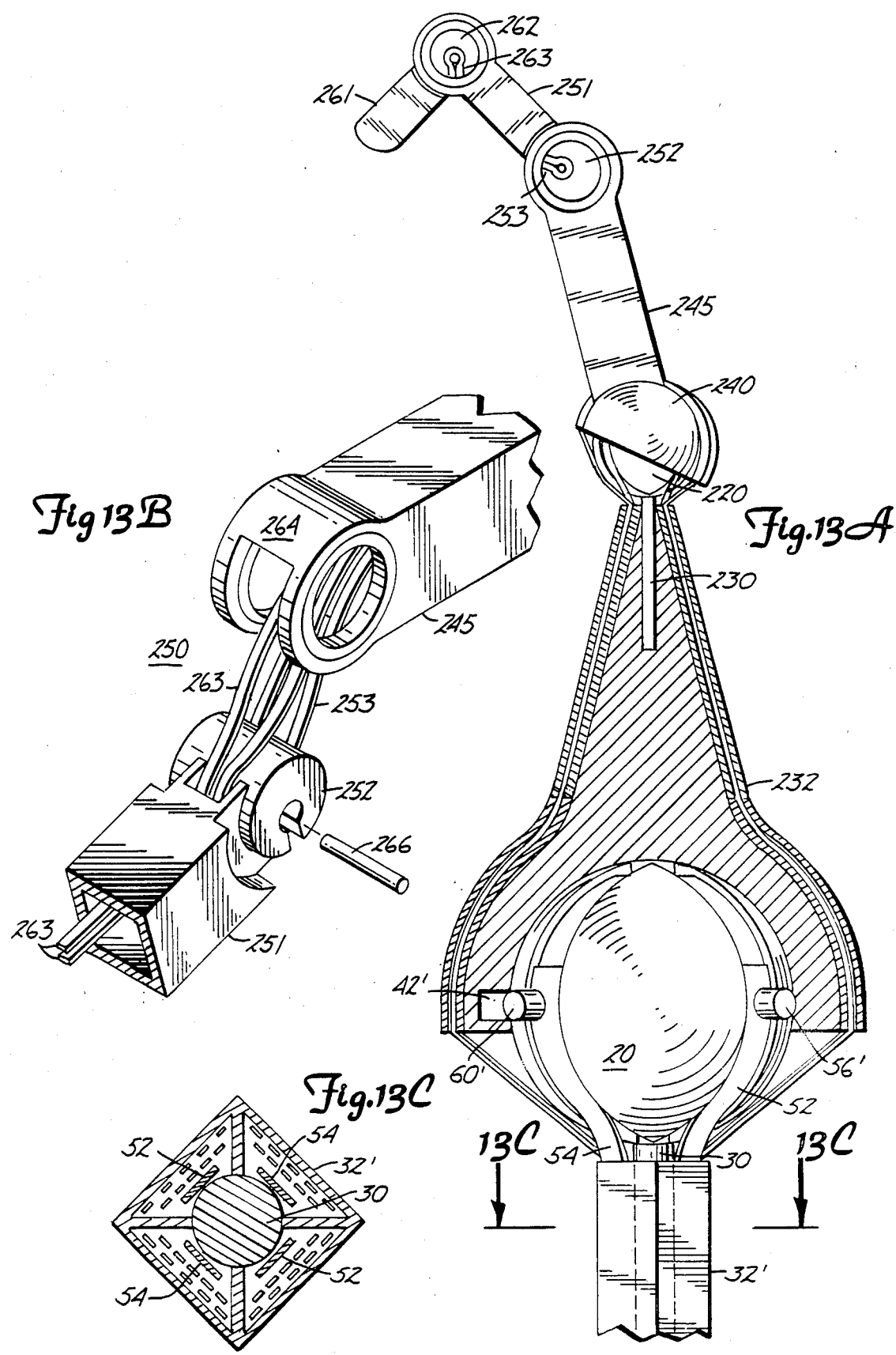

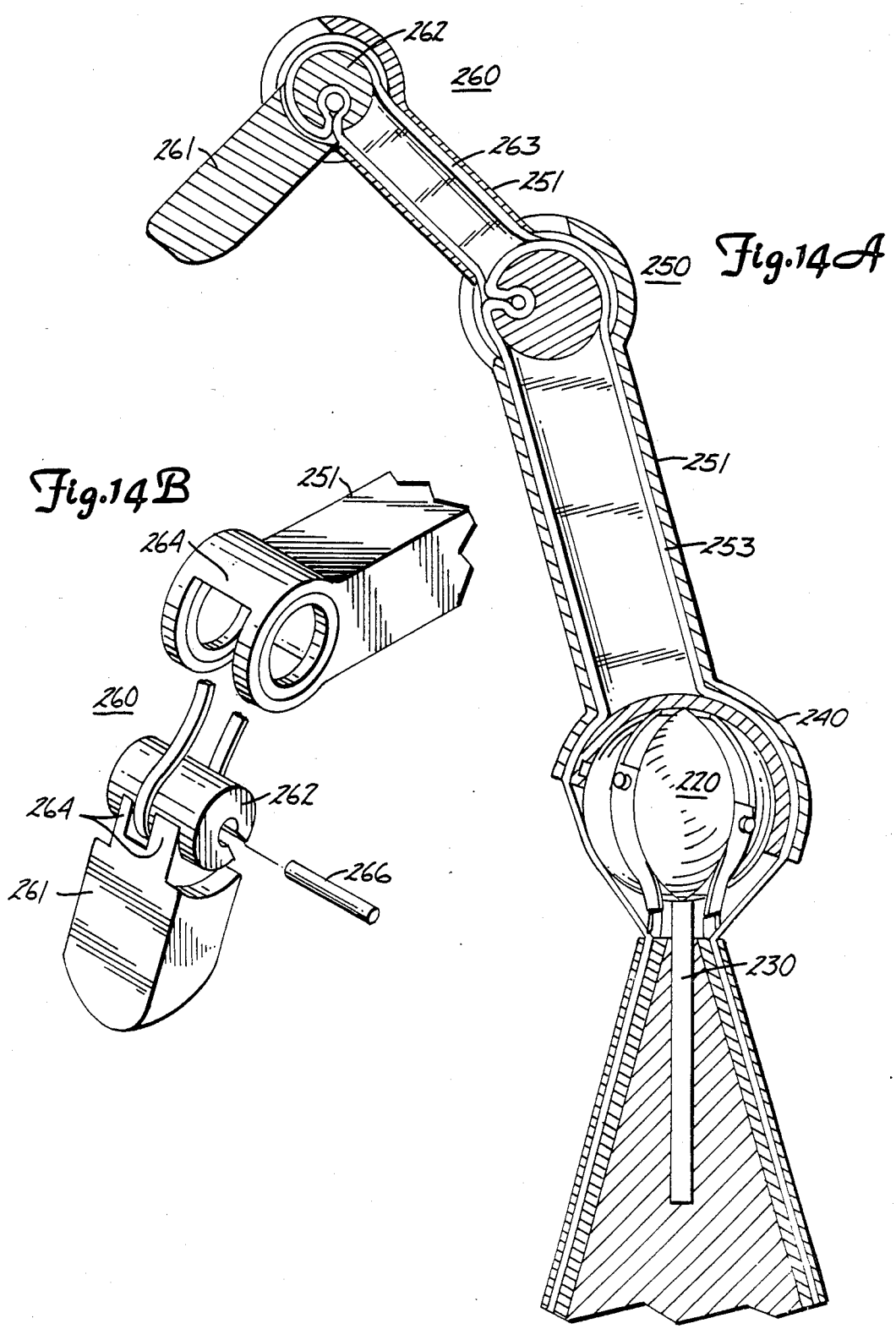

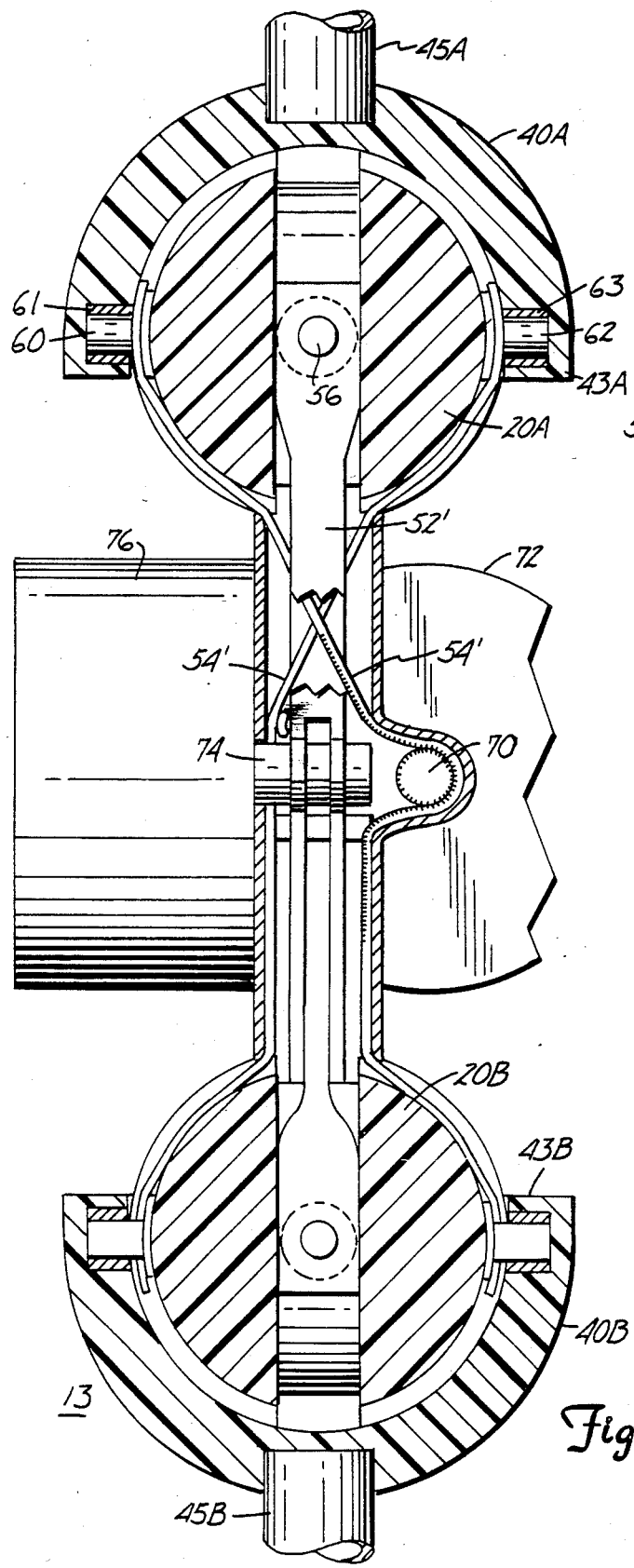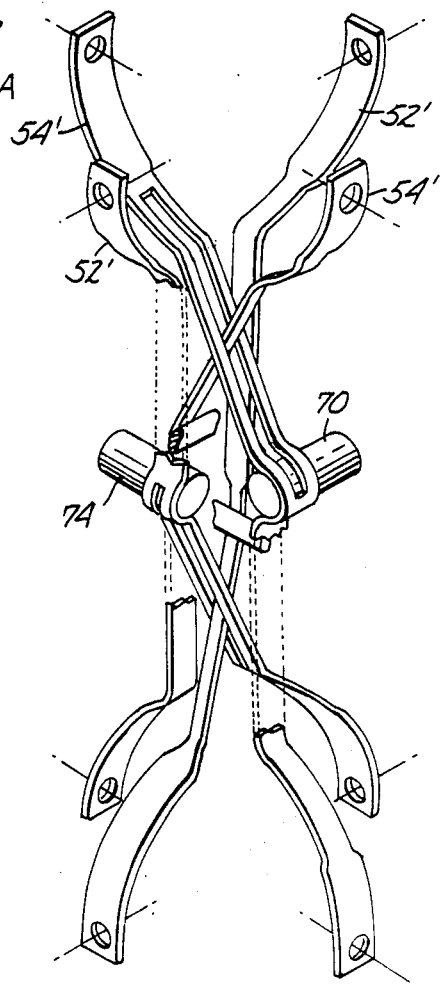
Fig. 15B
Fig 15A

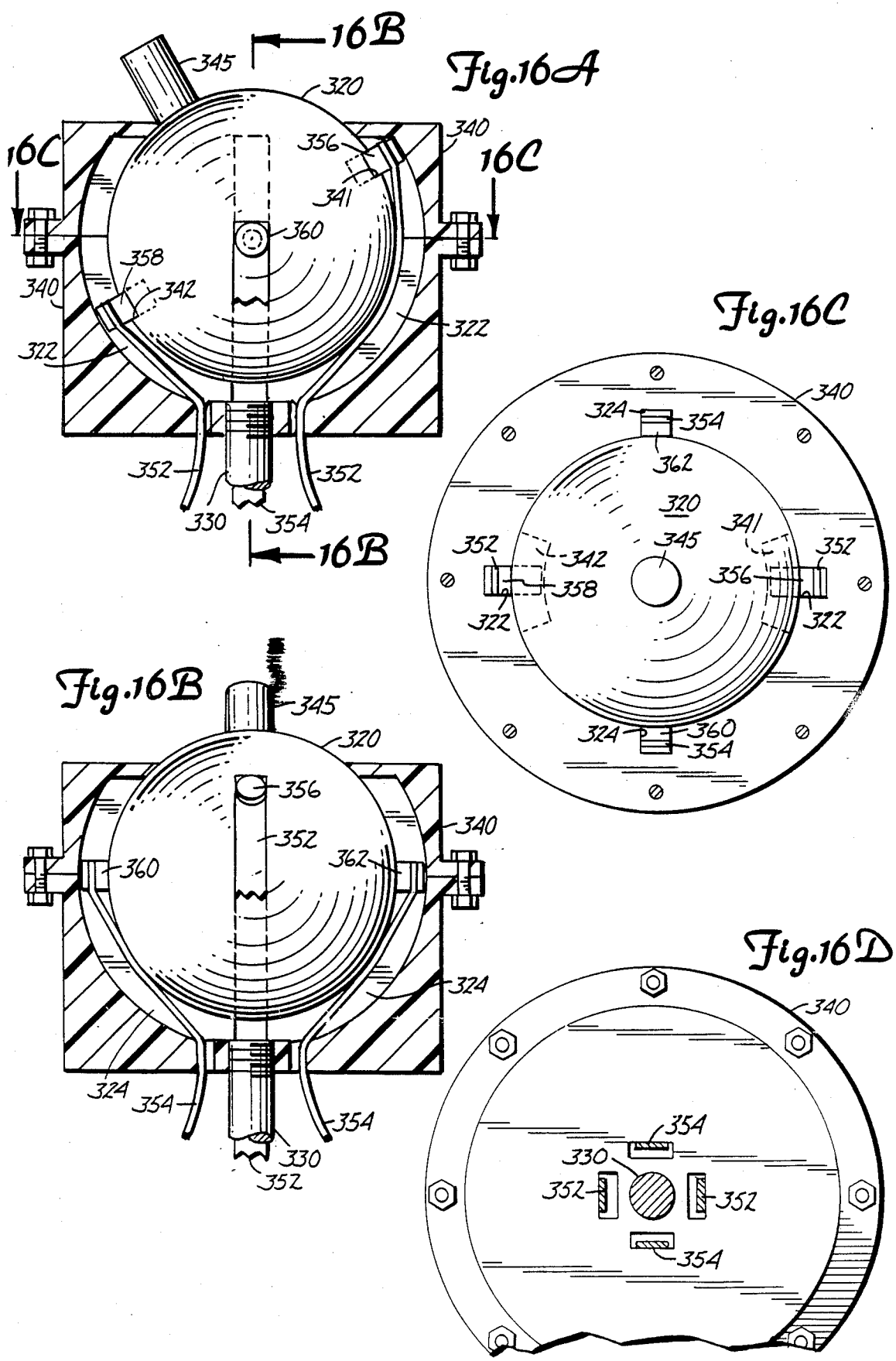

WRIST TENDON ACTUATOR

This application is a continuation-in-part of copending application Ser. No. 06/820,677, filed Jan. 21, 1986, which is now abandoned.

BACKGROUND OF THE INVENTION

1. Field of the Invention.

The present invention relates generally to mechanical joints and in particular relates to a mechanical joint for a robot wrist.

2. Description of the Prior Art.

Interest in robotics and the use of robots in industrial applications has greatly increased in recent years. One area in which the use of robots has become important is the replacement of humans in tasks that involve manual work, such as welding, material handling, paint spraying, and assembly. Many of these task require working in cramped spaces or performing complex maneuvers. To perform such tasks, a robot arm or wrist should be able to rotationally move in a range similar to a human wrist and at a dwell time acceptable for the particular task involved.

One article reviewing the development of robot arms and wrists is entitled, "Robot Wrist Actuators," Robotics Age, Nov./Dec. 1982, pp. 15-22, and was written by the applicant of the present application. In the article, several characteristics are described that make robot wrists attractive. One characteristic is that a mechanical arm or wrist can be safely used in areas where there is a danger of explosion if the wrist is driven by hydraulic actuators. However, there are several disadvantages with the prior art robot arms and wrists. Some of the disadvantages are also enumerated in the above-mentioned article and include large and bulky mechanical joints, slow dwell time in some rotational directions and low mechanical efficiency.

A number of well known universal joints are illustrated and described on pages 16 and 17 of the Pictorial Handbook of Technical Devices by Pete Grafstein and O. Schwarz, published by the Chemical Publishing Company, Inc. of New York, 1971. Although rotational motion can be transmitted through the universal joints illustrated on pages 16 and 17, the universal joints cannot be used in operations for transmitting pitch, yaw and roll motion to an implement or tool member.

A rotary actuator mechanism is described in the Higuchi et al U.S. Pat. No. 4,009,644. However, the rotary actuator of the Higuchi et al Patent is not very useful for the transmission of pitch, yaw and roll motion to a tool or implement member.

A number of robot joints are illustrated in the Vykukal U.S. Pat. No. 3,405,406 and the Vykukal et al U.S. Pat. No. 4,046,262. The Vykukal patents describe hard-type space suits that permit the user inside the space suit to move around somewhat unrestricted.

The Bolner U.S. Pat. No. 3,912,172 describes a backdrivable, direct drive, hydraulically-actuated pitch and roll actuator.

The Rosheim U.S. Pat. Nos. 4,194,437 and 4,296,681, which were issued to the applicant of the present application, describe hydraulic servomechanisms which impart rotary movements to a device to be driven.

The Stackhouse U.S. Pat. No. 4,068,536 describes a remotely-driven, mechanical manipulator. The manipulator is controlled by three concentric drive shafts which terminate in a spherically-spaced wrist mechanism.

The Totsuka U.S. Pat. No. 3,739,923 and the Niitu et al U.S. Pat. No. 3,784,031 describe a manipulator arm having two parallel rotating drive shafts in a beveled gear system which translates the drive shaft's rotating motion to a bending pitch motion and rotary roll motion in a tool member.

A mechanical wrist is described in German Pat. No. 2,752,236 that includes three electric motors, providing pitch, yaw, and roll, which are mounted on the outside of a housing with the inside of the housing being hollow. The wrist is used for holding welding tongs and the hollow inside housing permits electrical power lines to be fed through the wrist.

The Molaug U.S. Pat. No. 4,107,948 describes a flexible robot arm that is composed of a number of mutually connected rigid links being connected at one end to a drive means and at the other end to a tool member that is to be rotated. Another robot arm is illustrated in the Wells U.S. Pat. No. 3,631,737. The robot arm of the Wells Patent includes a plurality of rigid tubular sections joined end-to-end by flexible joints to form an articulated arm. The rigid sections are manipulated by slender control cables which are attached to the respective sections and selectively extend and retract.

U.S. Pat. No. 4,575,297 to Richter shows, among various robot portions, a portion for simulating a human hand. The hand is programmed to repeat motions that it is taken through by a human hand inserted therein.

A dextrous "hand" formed of four degree of freedom, multiple joint "fingers" is disclosed in the article "The Utah/MIT Dextrous Hand: Work in Progress" by S. Jacobsen, J. Wood, D. Knutti and K. Biggers, published in the book *Robot Grippers* edited by D. Pham and W. Heginbotham in 1986, at pages 341-89. Motions are controlled by "tendons" in the form of polymeric materials in a sheath.

SUMMARY OF THE INVENTION

The present invention is a ball and socket mechanical joint having pitch, yaw and compound pitch-yaw movement, particularly adaptable for anthropomorphic joint design including hand knuckles and personal robots. The mechanical joint is singularity-free and backdrivable for walk-through programming. The mechanical joint is a simple and rugged economical design and is easily miniaturized.

The mechanical joint includes a spherical member having a pair of grooves in its outer surface, each groove extending circumferentially about the spherical member and disposed approximately 90° from each other. A housing means has a concave spherical socket for receiving the spherical member. The housing means includes a pair of slots located proximately at an equatorial plane of the spherical member. A frame means is fixedly secured to the spherical member at the intersection of the first and second grooves opposite the housing means. A first ribbon means, slidable within the first groove, is attached to pivot pins in the slots of the housing means and is looped around a first pulley within the frame means. A second ribbon means slidable within the second groove, is attached to pivot pins mounted in the housing means at the approximate midpoints between the slots of the housing means. The second ribbon means is attached to a second pulley within the housing means. An output means is fixedly connected to the housing means. A first and second drive means provide selective movement of the first and second ribbon means.

In a first alternate embodiment, an integral passageway for fluid is provided in the mechanical joint of the present invention. In a second alternate embodiment, a pair of sleeve assemblies teaches roll movement for the wrist actuator combined with the pitch and yaw movements.

A further alternative embodiment involves use of a bearing to support the pivot pins in place of the pivot pins riding on surfaces of slots. Another alternate is the use of bails to hold the spherical member rather than a housing means with a concave spherical socket.

An inverse mechanical joint in which the spherical member can be caused to move through actuation means while supported by the housing is a further alternative.

Furthermore, multiple mechanical joints can be used to provide more flexibility and dexterity in a mechanical manipulation system to aid in using the final manipulation objects external to the system. Such use of multiple joints permits simulating the behavior of a human hand. More than one kind of mechanical joint may be desired for use in such multiple joint systems.

BRIEF DESCRIPTION OF THE DRAWINGS

FIG. 1 is a perspective view of the apparatus of the present invention, with portions broken away for clarity.

FIG. 2 is a sectional view taken along line 2—2 of FIG. 1.

FIG. 3 is a sectional view taken along line 3—3 of FIG. 1.

FIG. 4 is a sectional view taken along line 4—4 of FIG. 3 illustrating a ball of the present invention.

FIG. 5 is an alternate embodiment of the present invention illustrating an internal fluid passageway.

FIG. 6 is a detailed view of the embodiment of FIG. 5 showing the port in a pivot pin.

FIGS. 8A and 8B, the latter a partial cross section view of the former, show an alternative embodiment of the present invention using bearing support pivot pins in place of pivot pins riding on flat surfaces.

FIGS. 9A and 9B show an alternative embodiment of the present invention using a pair of bails to hold the spherical member.

FIGS. 10A, 10B and 10C, the latter a cross section view of the first, show an alternative embodiment permitting use of motors or other motive means located close to a mechanical joint to operate further items affixed to the joint housing, and these figures further show ribbon means for directly operating the joint, that are arranged about the foregoing local motor means.

FIG. 13A shows a cross section view of FIG. 11B, FIG. 13B shows an exploded view of a portion of FIG. 13A, and FIG. 13C shows a cross section view of FIG. 13A.

FIG. 14A shows a cross section view of a portion of FIG. 13A, and FIG. 14B shows an exploded view of a portion of FIG. 14A.

FIG. 15A shows, in a cross section view, another multiple mechanical joint arrangement, and FIG. 15B shows an exploded view of a portion of FIG. 15A.

FIGS. 16A, 16B, 16C and 16D show various cross section views of an inverse form of the present invention.

DETAILED DESCRIPTION OF THE PREFERRED EMBODIMENTS

Figure 7:
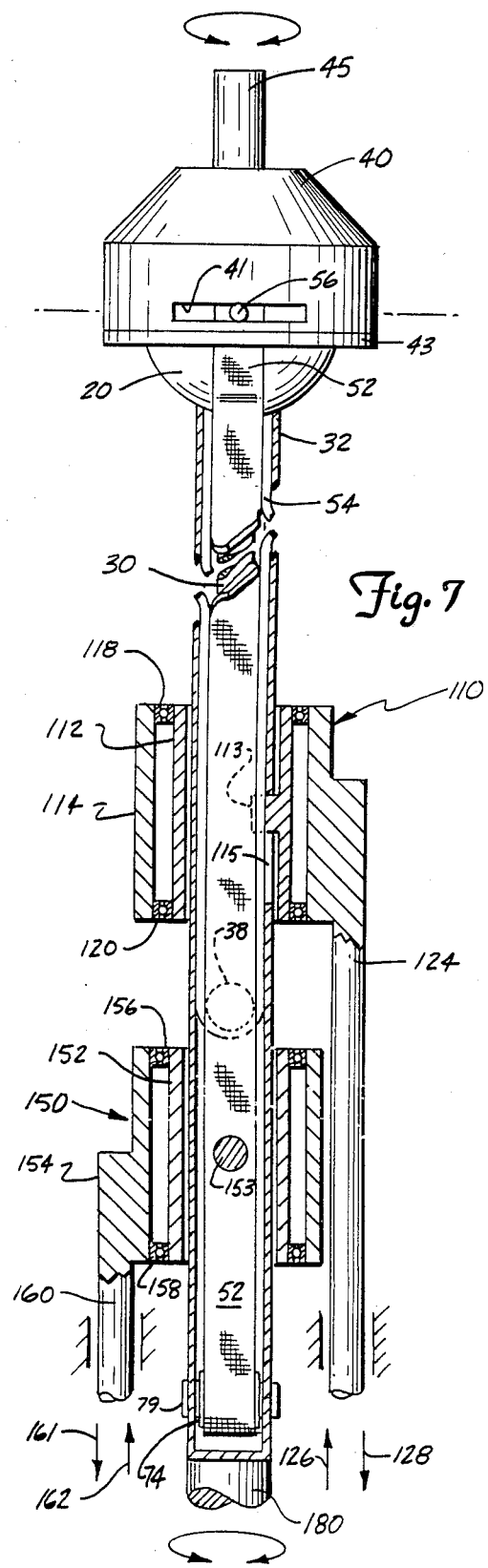
FIG. 7 is an alternate embodiment of the present invention showing a roll axis and a pair of slidable sleeve assemblies.

The mechanical joint or wrist actuator generally indicated at 10 of the present invention is illustrated in FIG. 1. Throughout the figures and the embodiments, like reference characters are used to indicate like elements.

A ball or spherical member 20 is fixedly connected to a frame member 32. The ball 20 includes a pair of grooves 22 and 24 cut circumferentially and approximately 90° apart from each other in the outer surface of the ball 20.

The frame member 32 is preferably an elongated hollow and generally rectangular frame. The frame 32 is connected to the ball 20 at a point where the grooves 22 and 24 intersect. A shaft or rod 30 is fixedly mounted inside the ball 20 and extends into the open central portion of the frame member 32.

A housing 40 receives the ball 20 and includes a concave spherical socket or cavity for receiving the ball 20. The housing 40 slides over the outer surface of the ball 20 in a manner similar to a ball-and-socket joint. The housing 40 includes a pair of rectangular slots 41 and 42 as best seen in FIG. 4. The slots 41 and 42 are disposed at proximate an equatorial plane of the ball 20. The slots 41 and 42 are diametrically opposed to each other. A retaining flange 43 is secured to the housing by screws 44A–44F.

The housing includes an output shaft 45 secured by a nut 46. If desired, the output shaft may be integral with the housing 40, as illustrated in FIGS. 5 and 7. It is to be understood that the output shaft 45 in the Figures is representative of any desired tool implement, such as a disk, grippers, and the like.

A pair of tendons or ribbons 52 and 54 are wrapped around the ball and disposed within the grooves 22 and 24 respectively. Each ribbon 52 and 54 is movable within its respective groove as will be described subsequently. The ribbons are made of a flexible, yet strong material, such as a reinforced fabric.

As illustrated in FIG. 3, the ribbon 52 has a first end 52A which is inserted over a first flanged pin 56 and a second end 52B which is inserted over a second flanged pin 58. The pins 56 and 58 along with the ribbon ends 52A and 52B slide in the groove 22. The ribbon 52 extends along the groove 22 of the ball 20 and through the frame member, between the rod 30 and the frame member 32, and exits the frame member 32 at an opening 34. An idler 36 rotatably secured into the frame 32 reduces slack in the ribbon 52 as it exits the opening 34. The ribbon 52 loops around a pulley 70 and passes over a pulley 38. The pulley 38 is mounted within the frame member 32 by pin 39 attached to the frame member at a point where the shaft 30 terminates. The ribbon 52 extends back through the opening 34 inside the frame member 32 and extends upwardly between the rod 30 and the frame member 32 into the groove 22 of the ball 20 up to pin 58. The pins 56 and 58 are extended into and slidably engage slots 41 and 42, respectively, of the housing 40.

As illustrated in FIG. 2, the ribbon 54 extends into the groove 24 and is held at an end 54A by a flanged pin 60 and at an end 54B by a flanged pin 62. The pins 60 and 62 along with the ribbon ends 54A and 54B slide in the groove 24. The pins 60 and 62 rotatably engage bearings 61 and 63, respectively. The bearings 61 and 63 are mounted to the housing and are disposed about the equatorial plane of the ball 20 at midpoints between slots 41 and 42. Thus, the pins 60 and 62 are approximately 180° from one another. The ribbon 54 extends downwardly from the ball 20, through the frame member 32 and is looped around a pulley 74. The pulley 74 is located proximate a bottom end of the frame member 32.

The pulley 70 is mounted to an output shaft 71 of a motor 72. The ribbon 52 is looped over the pulley 70 and moved by the motor 72 as best illustrated in FIG. 1. The pulley 74 is mounted to an output shaft 75 of a motor 76 by a snap ring 77. Ribbon 54 is looped over pulley 74 and activated by motor 76. Any desirable means of connecting ribbons 52 and 54 to a driven shaft is includable within the present invention. It is preferred that the motors be bidirectional, that is, capable of driving ribbons 52 and 54 in two directions.

FIG. 4 is a sectional view taken along the equatorial plane of the ball 20. The ball 20 and grooves 22 and 24 travel intact and the housing 40 is shown in section. The grooves 22 and 24 extend circumferentially around an outer surface of the ball and intersect at the ball's top. The ribbon 52 is connected to the pins 56 and 58 which slide within slots 41 and 42, respectively. The ribbon 54 is connected to pins 60 and 62 which rotate within the bearings 61 and 63, respectively.

As the housing is rotated in pitch, yaw or compound pitch-yaw movement on the ball 20, the ribbons 52 and 54 slide within their respective slots and move about their respective pulleys. Simple pitch movement of the wrist actuator 10 is accomplished by pivoting the housing 40 about pins 56 and 58. In this manner, ribbon 54 travels and slides within groove 24. Simple movement about the yaw axis occurs when the housing 40 pivots about pins 60 and 62, causing ribbon 52 to slide within groove 22. In compound pitch-yaw movement, pins 56 and 58 slide within their respective slots 41 and 42 as the housing 40 rotates and pivots about pins 56, 58, 60 and 62.

The wrist actuator 10 of the present invention can be adapted to provide a fluid channel or passageway 80 as illustrated in FIGS. 5 and 6. In the embodiment in FIGS. 5 and 6, the rod 30 and the ball 20 are shown as an integral structure. Additionally, the housing 40 and the output shaft 43 are shown as an integral structure. An internal bore 82 is provided in the rod 30 and ball 20. The bore 82 leads to an interior fluid chamber 84 defined by the housing 40 and the ball 20. The chamber 84 is sealed by a ring liner 86 which is positioned and slides within groove 24. The ring linear 86 includes a pair of flanged pins 87 and 88 that replace pins 60 and 62 of the embodiment shown in FIGS. 1-4. In addition, ring liner 86 includes a seal 89 to contain the fluid in the chamber 84.

A detailed section view of the ring liner 86 and pin 88 is illustrated in FIG. 6. An internal port 90 is provided along the longitudinal axis of pin 88 from the flange portion to a desired position on the outer surface. The port 90 allows fluid to flow from the interior fluid chamber 84 to an internal bore 92 that extends through the housing and the output shaft. A pair of O-rings 94 and 96 are provided on the pin 88 on opposite sides of the housing bore 92 to prevent leakage from the port 90. The ring liner 86 is secured to the housing 40 by pins 87 and 88 and slides with the housing 40 over the ball 20. The ribbon 54 is held in place by pins 87 and 88 in a manner similar to the embodiment of FIGS. 1-4.

An alternate embodiment of the present invention having a roll axis is depicted in FIG. 7. A pair of sleeve assemblies 110 and 150 are slidably connected to the frame member 32. The first sleeve assembly 110 includes an inner sleeve 112 and an outer sleeve 114. A peg 113 projecting from the inner sleeve 112 slides along the longitudinal axis of the frame member 32, the pegs travel within the borders of a slot 115 of the frame member 32, causing the ribbon to move through the frame member and about the pulley 38.

The outer sleeve 114 is decoupled from the inner sleeve 112 by a pair of ring bearings 118 and 120. The ring bearings permit the outer sleeve 114 to rotate about the inner sleeve 112. A linearly-actuated rod 124 is fixedly connected to the outer sleeve 114. Any suitable drive means, such as an electric motor or hydraulic cylinder, can be used to actuate the drive rod 124 along the arrows 126 and 128. Linear movement of the rod 124 is transmitted to the wrist actuator 10 by the ribbon 54 to provide yaw movement.

In a similar manner to the first sleeve assembly 110, a second sleeve assembly 150 is slidable along the longitudinal axis of the frame member 32. An inner sleeve 152 is connected to the ribbon 52 by a peg 153. As the inner sleeve 152 travels along the longitudinal axis of the frame member 32, the ribbon 52 is rotated inside the frame member 32 about pulley 74 mounted on pin 79.

The outer sleeve 154 is decoupled from the inner sleeve 152 by a pair of ring bearings 156 and 158. A rod 160 is fixedly connected to the outer sleeve 154. Any suitable drive means for actuating the rod 160 along arrows 161 and 162 may be utilized and provide pitch movement to the wrist actuator 10.

A drive shaft 180 is fixedly connected to an end of the frame member 32 opposite the ball 20. As the drive shaft rotates, sleeve assemblies 110 and 150 decouple the rods 124 and 160 from the frame member 32. Thus, roll movement may be transmitted to the output shaft 45 simultaneously with pitch and yaw movement through the actuation rods 124 and 160.

FIGS. 8A and 8B show an alternative embodiment of the mechanical joint which avoids having pivot pins 56 and 58 riding on the sides of slots 41 and 42, respectively, as in the foregoing embodiments. This is accomplished by adding a bearing, 200, to which two of the pivot pins, now redesignated pins 56' and 58' (only 56' is seen), are attached by bushings, 201, thereby permitting them to rotate therein. The bushing, in turn, can move circularly along bearing 200 parallel to slots 41 and 42 through which pins 56' and 58' extend, respectively. Thus, wear on the sides of slots 41 and 42, due to pins 56 and 58 sliding therealong in previous embodiments, is eliminated during excursions of housing 40 about ball member 20—pins 56' and 58' are now held by bushing 201 and bearing 200 and not directly by slots 41 and 42.

As can be seen from FIG. 8B, ball member 20, as before, is positioned in a recess in housing 40. This recess has a surface of a generally hemispherical shape past an equator of the hemisphere which begins approximately where the plane, determined by the axes of the pivot pins 56' and 60, intersects housing 40. The portion above such an equator in FIG. 8B then is concave, at least up to any opening in housing 40 provided to accommodate output shaft 45, or any other opening at that location for another purpose. That is, the recess in housing 40, which ball member 20 fits into to permit housing 40 to rotate in multiple directions thereabout, ends in a concave surface portion past the equator thereof, at which this surface portion begins up to any passageway provided near the top of housing 40. This concave surface portion follows a hemispherical shape to accommodate the ball member.

Ball 20 has been shown to this point captured in a recess having a hemispherical end surface or surface portion past an equator thereof, i.e. a concave or partially concave cavity, provided within housing 40. However, this is not the only arrangement which will provide a satisfactory mechanical joint permitting multiple direction rotation about ball 20. As an example, an alternate means of capturing ball member 20, a means which is also centered about an equatorial plane of ball member 20 so that the capture means can rotate thereabout, can be seen in FIGS. 9A and 9B. Ball member 20 is shown there held by a pair of shoes, 205 and 206, placed in grooves 22 and 24 and which can slide along these grooves.

Shoe 205 is shown positioned in FIG. 9A underneath ball member 20 so that it can slide between the ball member and that portion of frame member 32 shown to which ball member 20 is mounted. Ribbon 54 is connected to pins 60 and 62 as before, but now is positioned over shoe 205, typically in a groove formed in the back of shoe 205. Shoe 206 is shown positioned over the top of ball 20 in FIG. 9A so that ball member 20 is between shoes 205 and 206. Each of shoes 205 and 206 has an interior surface following the shape of a circular arc of a radius proper to permit these surfaces to ride against the bottom of grooves 22 and 24.

Shoe 206 is attached to pivot pins now redesignated as 56''' and 58''. These pins are held in bushings, 56''' and 58''', respectively, which in turn are each held in the opposite ends of a bail, 207. Bail 207 is rotatably connected to another bail, 208, in the opposite ends of which pivot pins 60 and 62 are held in bushings 61 and 63, respectively.

The rotary connection is best seen in FIG. 9B where a shaft, 45', serving as the output shaft, is permitted to rotate in a bushing, 45'', in bail 208. This shaft is held by a key, 45''', in bail 207. Thus, if ribbon portions 52 and 56 nearest the viewer in FIG. 9A where both pulled downward so that ball member 20 tilted directly out of the figure toward the viewer, portions of the shoes 205 and 206 closest to the viewer would also move downward. These would result in pin 56'' and pin 60 also moving downward and coming toward one another as grooves 22 and 24 approach one another. Therefore, bail 208 would rotate about shaft 45' to permit pins 56'' and 60 to move toward one another. Motion in the opposite direction, by placing tension on the other portions of ribbons 52 and 54, would result in pins 60 and 56'' receding from one another as they move upward in FIG. 9A. These motions of pins 56'' and 60 are just those that would be encountered by comparable pivot pins in previous embodiments described for housing motions leading to a comparable motion of the corresponding output shafts.

Multiple joints, each of the nature described in the foregoing or other types, can be mechanically connected together to provide various additional motion possibilities. That is, the frame, i.e. support, for one joint could be connected to either the housing or the frame of another joint. Various alternative arrangements of the extended ribbons, or other extended means, fastened to the pivot pins for operating such multiple joints can be used. One alternative is shown in FIG. 10A where the second joint has been omitted for clarity. However, the second mechanical joint is contemplated as being mounted on hollow output tube 45 with the control ribbons therefore extending down through the interior of that tube which thus serves as an extension of frame 32 in previously described embodiments.

Ball member 20 has been modified by providing a passageway, 209, therethrough along a diameter which extends from the top of ball member 20 to the bottom thereof. Passageway 209 can be seen in FIG. 10A through the more fully opened housing shown there, now redesignated 40'. A more direct view is seen in the cross section view of FIG. 10C. The ribbon from a second mechanical joint would pass through tube 45 and passage 209 and down into frame member 32 as would ribbons 52 and 54 for the joint shown (and possibly further ribbons if yet further joints were mechanically connected to the second joint).

All such ribbons could be extended to reach any convenient set of actuators as has been shown in FIGS. 1, 2, 3 and 7. Another alternative is shown in FIG. 10A where a package of actuators, 210, is shown which directly manipulates the ribbons extending from joints connected to output shaft 45. Ribbons 52 and 54 are manipulated by other actuators in contact with ribbon blocks, 211 and 212. Ribbons 52 and 54 are wrapped around a pair of supplementary channeled frame portions, 213 and 214, which are outside actuator package 210 to force ribbons 52 and 54 away from the axis of shaft 32 to provide room for package 210. A bottom view is shown in FIG. 10B.

Figure 11A:
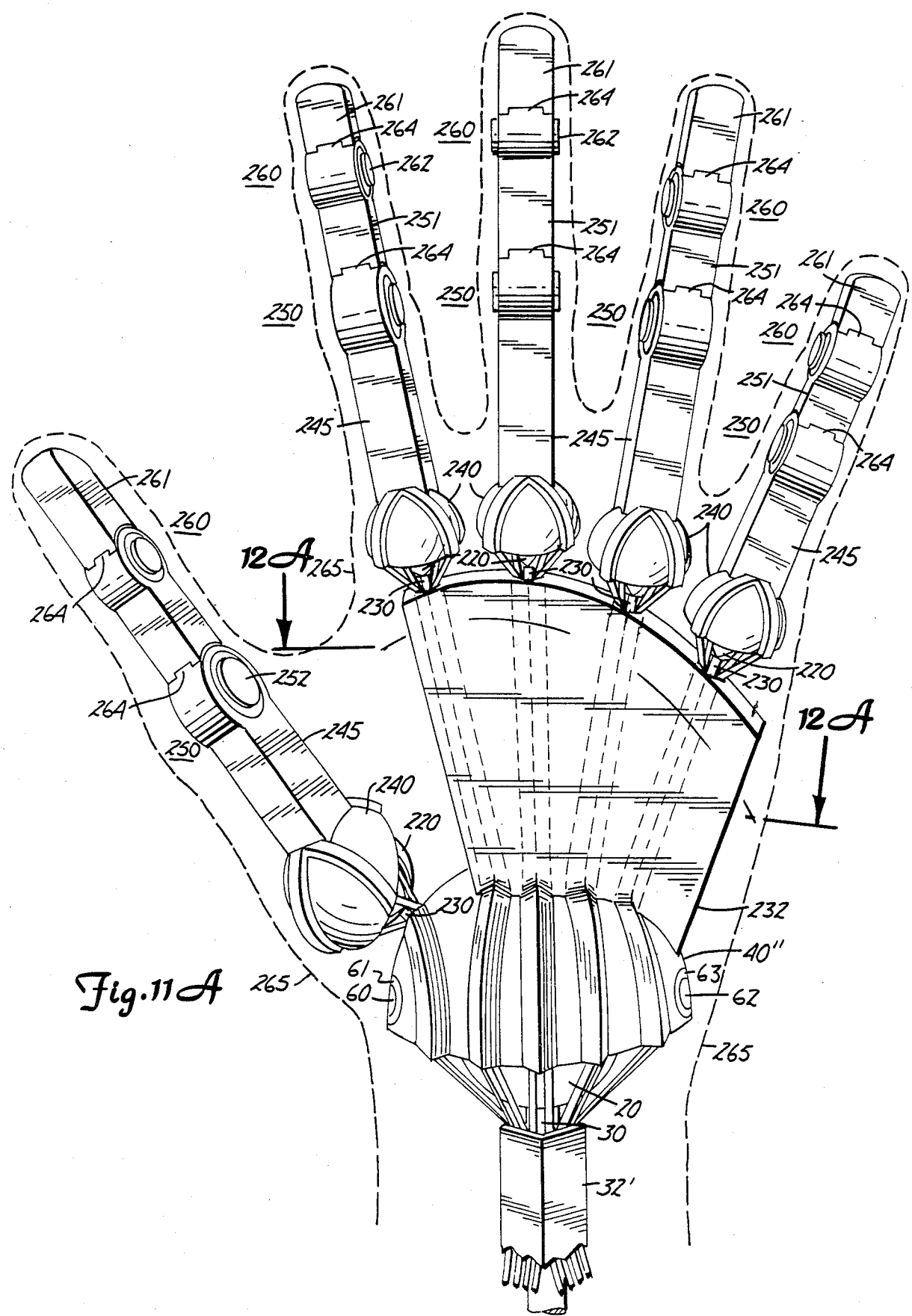
FIGS. 11A and 11B show use of multiple mechanical joints of more than one kind which are positioned to permit simulating operation of a human hand.
Figure 11B:
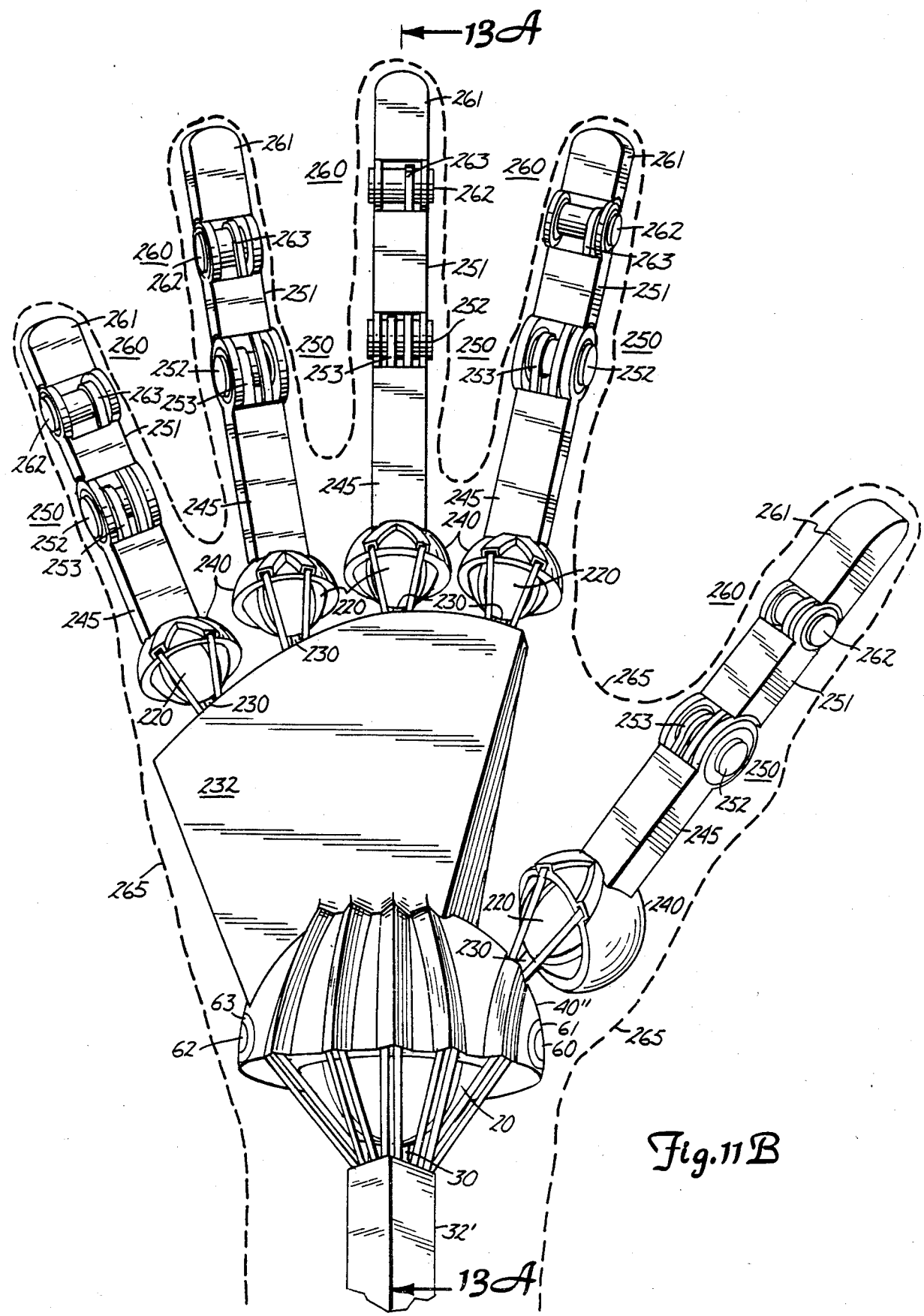

Another possibility for routing the ribbons from a second mechanical joint to the control space framed within frame 32 of the first joint is to array them over the exterior of housing 40. Such an arrangement is shown in FIGS. 11A and 11B in a more extensive example of the use of multiple joints mechanically connected together. In the system of joints shown there, a human hand and wrist are simulated. FIG. 11A shows the back of the simulated hand with the frame redesignated as 32' to accommodate a larger number of control ribbons therethrough. Shaft 30 inside frame 32' supports ball member 20. The housing has been redesignated as 40'' because of the control ribbon channels which have been arrayed on its outer surface for the control ribbons from the subsequent mechanical joints to be routed through. Ball member 20 and housing 40'' together form the mechanical joint simulating a human wrist.

The frame members for each of the further mechanical joints simulating knuckles at the base of the fingers jointly form a single rigid body as a combined frame and this has been designated 232. The other portions of these joints and of the joints simulating the base knuckle of the thumb also have the numbers they had in previous drawings with 200 added thereto. Thus, each of the ball members of these joints are designated 220 and each of the housings are designated 240. Each ball member is supported on a shaft 230. Housings 240 have output shafts designated as 245.

Mounted on each of the output shafts 245 is a further joint, 250, but these are joints which can rotate about only one axis as opposed to the lower joints which can each rotate in many axes about its corresponding ball member. These joints simulate the middle knuckle of the human finger. Thus, each output shaft 245 is also the base or support for a corresponding joint 250. The other member, 251, of joint 250 is the rotary member which has an extension pin, 252, which can rotate within the corresponding base member 245 under control of a ribbon, 253.

Rotary members 251 for joints 250 serve also as the base members of a further set of joints, 260. Joints 260 simulate the last joints on the human finger with an added one in in the simulated thumb beyond that which is found in the human thumb. Joints 260 each have a further member, 261, which has an extension pin, 262, which can rotate within the corresponding base member 251 (rotary members for joints 250) under the control of a last ribbon, 263. Joints 250 and 260 each have a stop, 264, to limit rearward rotation.

The entire structure of FIGS. 11A and 11B, as a simulated human hand and wrist, would be covered with a plastic hand simulation means, 265, shown in dashed line form. Glove-like arrangement 265 may have special materials provided at the insides of the simulated finger tips to aid gripping.

The multiple rotation axis mechanical joints in FIGS. 11A and 11B can be formed by molded plastic housing 240 and 40″, each of which has a portion that extends a little beyond the equator for the hemisphere followed by the recess therein. Thus, the housings each cover a bit more than a hemisphere of a corresponding ball member placed within its recess. The slots, corresponding to slots 41 and 42 earlier described, are hidden within housings 240 and each contain a corresponding pivot pin. The cylindrical recesses for each of the other pivot pins are also hidden in each housing 240. Housings 240 are forced over balls 220 with ribbons and pins in place in housings 240 so that, when housings 240 yield sufficiently to snap over ball members 220, the portions of the housing past the recess equator are also past the equator of ball members 220. Thus, these additional housing portions serve to hold ball members 220 in housings 240 without use of a retaining flange.

Similarly, the bases for joints 250 and 260 can be formed by molded plastic and are seen in FIGS. 13B and 14B to have spaced member sides which permit the rotary member extension pins to snap therebetween. Each rotary member can then rotate within its corresponding base member.

Similarly, housing 40″ has a recess which extends past the hemisphere equator and has slots hidden therewithin corresponding to earlier described slots 41 and 42, now redesignated 41′ and 42′ as can be seen in FIG. 13A (with the exception that slot 41′ is hidden in that view). Housing 40″, with the pins and ribbons in place therein, can be snapped over ball member 20 to hold ball member 20 therein. However, for additional strength, pins 60 and 62 are again fitted in bushings 61 and 63 in housing 40″ rather than just using hidden cylindrical recesses.

Figure 12A:
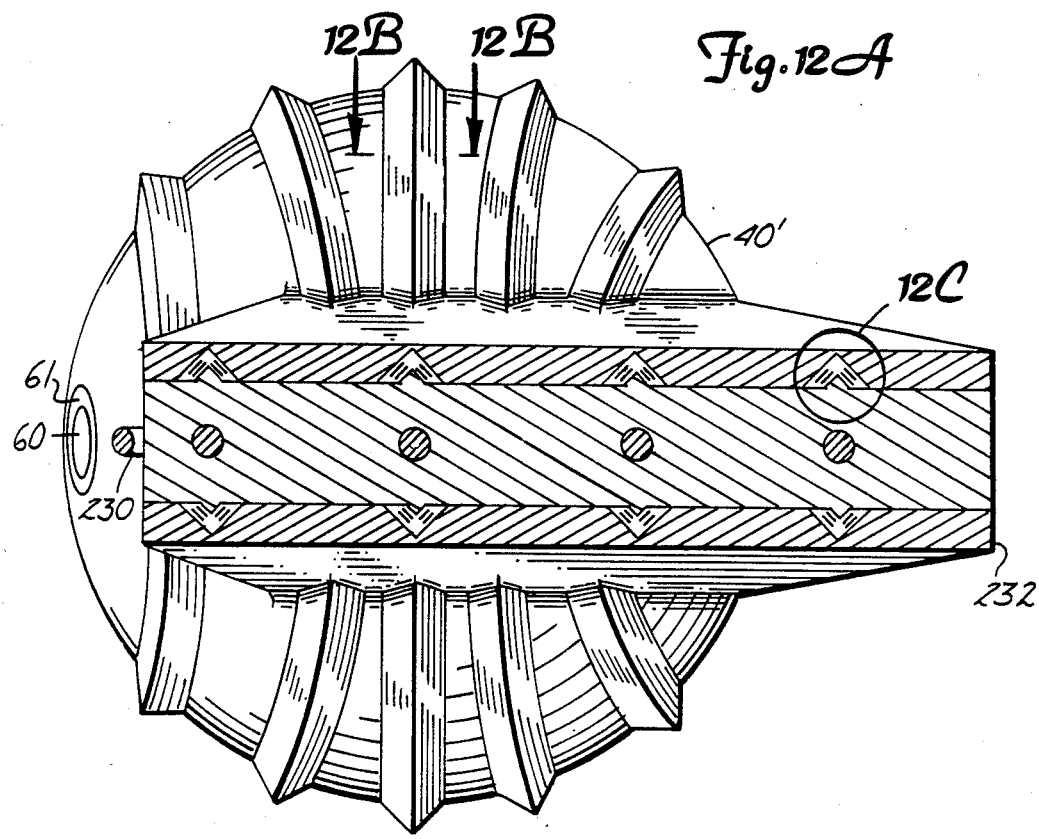
FIG. 12A is a cross section view of a portion of FIG. 11A.

A cross section view of FIG. 11A is shown in FIG. 12A. This partial section view shows rigid body 232, serving as a base support means for the joints simulating finger base knuckles, and indicates the routing of control ribbons from the upper finger joints and the base knuckle joints through rigid body 232. A fragmentary cross section view in FIG. 12B is taken of a housing surface tunnel from among these shown arrayed over the side of housing 40′ for routing control ribbons.

Figure 12B:
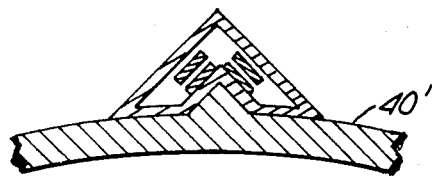
FIG. 12B is a partial cross section view of a portion of FIG. 12A.
Figure 12C:
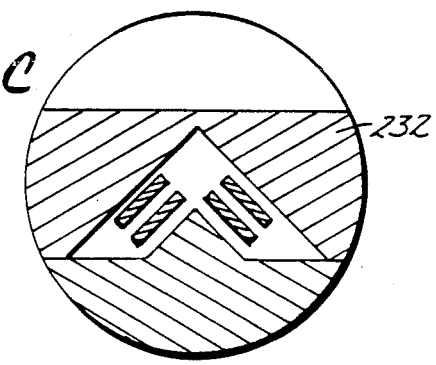
FIG. 12C is a breakaway view of a portion of FIG. 12A.

The lower two ribbons shown in FIG. 12B are for controlling the base knuckle joint in cooperation with the lower two ribbons in the corresponding tunnel on the opposite side of rigid body structure 232. The upper level of ribbons shown in FIG. 12B are for controlling each of the single axis upper finger joints in cooperation with the two for the upper finger joints from the corresponding tunnel on the opposite side of housing 40′. FIG. 12C is a fragmentary breakaway view of a portion of rigid body 232 showing how the corresponding ribbons for that finger are routed through the passageways in rigid body 232.

FIG. 13A is a cross section view of Figure 11B but leaving the finger base knuckle joint and remaining finger portions fully formed in this view. FIG. 14A shows a cross section view of these fully formed portions that otherwise would have been seen in cross section in FIG. 13A. Furthermore, sections have not been taken through the ball members of the various joints. Finally, the various ribbon means have not been shown in their entirety, as in the portions passing through rigid body 232.

Note that the finger elements are mounted toward the lower edge of the housings 240 to give them a forward cant similar to fingers on a human hand. Thus, second joints mounted on housings of first joints may be so mounted at any place on the housing which is convenient for the purpose at hand.

Each of ribbons 253 and 263 are looped about the corresponding extension pins 252 and 262, respectively, for each of joints 250 and 260. A slot in each of pins 252 and 262 permit the corresponding ribbon to be looped within and to have a holding rod, 266, inserted to hold the ribbon to the pin extension. Thus, alternating tensions on the corresponding ribbons can cause the rotary member of the joint to rotate back and forth about the rotary member pin extensions. These ribbon connections to the extension pins can be seen in FIG. 13B for joint 250 and FIG. 14B for joint 260.

FIG. 13C is a cross section of frame 32′ showing the placement of the various ribbons within the space framed by frame 32′. Ribbons 52 and 54 are the large ribbons near shaft 30. The other ribbons are used to control the various finger base knuckle joints and the remaining finger joints and the thumb base knuckle joint and the remaining thumb joints.

A further alternative for multiple joints is shown in FIG. 15A where frames 32 for each of the mechanical joints, A and B, are joined together in a common frame structure, 32″, between joints A and B. Joints A and B are of the same general nature as has been previously described. Ribbons 52 and 54 are shown each divided into two pieces with each crossing through the other in an arrangement made clear in FIG. 15B, and so they have been redesignated 52′ and 54′. Where ribbons 52 and 54 were each a continuous loop from the pivot pin at one end to the pivot pin at the other, they are now shown as two separate ribbon portions with one end of each going to pivot pins in joint A and the other end of each going to pivot pins on the opposite side in joint B. Thus, the loop for each ribbon is maintained but with both housings as part of each loop.

So, for instance, the driving of one of ribbons 54′ by pulley 70 through the action of motor 72 in a clockwise motion will cause housing 40A to rotate counterclockwise, which will then pull on the other piece of ribbon 54' to cause housing 40B to rotate clockwise. A similar result will be obtained for the effect of driving pulley 74 on ribbons 52'. The simultaneous driving of pulleys 70 and 74 by their respective motors will lead to motions of each joint in opposing rotational directions with each rotation about some axis intermediate to the principal ones through the pivot pins.

If the ribbons shown in FIG. 15A had been connected to housings 40A and 40B without crossing one another, the housings would then each rotate in the same rotational direction. Clearly, the addition of more motors, with each ribbon from each joint going to its own motor, would allow the mechanical relationship of the frames of joints A and B to be maintained but with independent control of each of joints A and B.

The wrist actuator of the present invention is simple to operate and economical to manufacture. The ball 20 is constructed of any lightweight material capable of being formed to the specifications described. Plastics and other like materials such as sold by E. I. DuPont under the mark DELRIN are suitable for the ball 20. The wrist actuator 10 is singularity-free and back-drivable for walk-through programming. The wrist actuator 10 has up to 100 degrees of pitch motion and 100 degrees of yaw motion about a common center point, thereby avoiding gimbal lock in compound pitch-yaw motion.

An inverse form of the mechanical joint earlier shown in FIG. 1 is another alternative. In this form, the grooves are provided in the housing and the pins connecting the ribbon means are affixed to the ball member. Such an arrangement is shown in the cross section views of FIGS. 16A, 16B, 16C and 16D where the designation numerals used have the final two digits representing structures similar to those appearing in FIG. 1 but with a 3 placed in front thereof.

FIGS. 16A and 16B are side views of the mechanical joint having half of housing 340 removed but ball member 320 shown in full. FIG. 16C is a plan view of the mechanical joint having a portion of housing 340 removed but ball member shown in full. FIG. 16D is a bottom view of the mechanical joint showing a cross section of support rod 330 and of ribbons 352 and 354.

A support shaft or rod, 330, is shown affixed to and now supporting a housing, 340, having a recess therein again following a spherical shape. The recess now goes somewhat beyond the horizontal equator of the ball in FIG. 16A to accommodate the pins in the ball being rotated past that equator. Housing 340 is formed in two sections separated at this equator but joined together with convenient fasteners. The framing portion which is typically placed around the shaft 330 and ribbons 352, 345 imparting force to the ball has not been shown in these figures but could be used if desired.

Ribbon means 352 and 354 are attached to pins, 356 and 358, and 360 and 362, respectively. Pins 356 and 358 are each free to rotate within and translate equatorially about ball member 320 in a pair of diametrically opposed slots, 341 and 342, in ball member 320. Pins 360 and 362 are rotatably mounted within ball member 320, usually in bushings set into ball member 320.

Further, pins 358 and 356 are able to translate along a groove, 322, in housing 340 opposite a vertical equator of the spherical space about which the recess in housing 340 is formed. Similarly, pins 360 and 362 are free to translate within a vertical equatorial groove, 324, set at 90° to groove 322 in housing 340.

Ball member 320 is shown with an output shaft, 345, affixed thereto at which a variety of arrangements can be connected, such as grippers for performing useful functions. The possibility again exists of having an opening through ball 320 and output shaft 345 to accommodate wiring or further force imparting ribbons for items attached to shaft 345 including possibly a further mechanical joint. A larger access opening would be needed at the opposite side of ball member 320 from shaft 345 to permit such items to flex in a larger access opening so they are not pinched between ball member 320 and housing 340. This is possible to accommodate because of the relatively restricted range of motion of shaft 345 because of the relatively narrower opening at the top of housing 340 exposing ball member 320.

Although the present invention has been described with reference to preferred embodiments, workers skilled in the art will recognize that changes may be made in form and detail without departing from the spirit and scope of the invention.

What is claimed is:

1. A mechanical joint comprising:
   a spherical member having a first and a second groove in its outer surface, each groove extending circumferentially around the spherical member and the grooves disposed approximately 90° from each other;
   housing means having a concave spherical socket for receiving the spherical member, a pair of slots located proximate an equatorial plane of the spherical member, each slot being disposed diametrically opposite the other slot;
   frame means fixedly secured to the spherical member at an intersection of the first and second grooves located exteriorly of the housing means;
   first ribbon means being slidable within the first groove and looped around a first pulley within the frame means, each end of the ribbon means attached to a pin inserted into a slot of the housing means;
   second ribbon means being slidable within the second groove and looped around a second pulley within the frame means, each end of the ribbon means attached to a fastener means having a pair of pins, the pins pivotally mounted to the housing means located proximately at the equatorial plane of the spherical member and disposed at the approximate midpoints between the slots of the housing means;
   output means connected to the housing means opposite the socket; and
   first and second drive means for effecting selective movement of the first and second ribbon means.

2. The mechanical joint of claim 1 wherein a rod is fixedly mounted to the interior of the spherical member and extended a desired length into the frame means.

3. The mechanical joint of claim 2 wherein the fastener means comprises a ring liner slidable within the second groove and terminating at each end in a pivot pin, one of the pins having an internal bore from its base to a desired position in its outer surface along its longitudinal axis.

4. The mechanical joint of claim 3 and further including an integral channel path for fluid comprising:
   an internal bore along the longitudinal axis of the rod;
   an internal bore through the interior of the spherical member complementary to the longitudinal axis of the rod; and an internal bore through the housing means from the opening for the pin having an internal bore to the output means.

5. The mechanical joint of claim 1 wherein the frame means is an elongated, hollow and generally rectangular frame.

6. The mechanical joint of claim 1 wherein the output means is integral with the housing means.

7. The mechanical joint of claim 1 wherein the drive means comprises:
a first and a second motor, the bidirectional rotation of the output shaft of the first motor transmitted to the first ribbon means, the bidirectional rotation of the second motor transmitted to the second ribbon means.

8. The mechanical joint of claim 1 and further comprising:
rotation means connected to the frame means for bidirectionally rotating the frame means about its longitudinal axis; and
a sleeve means slidable along the longitudinal axis of the frame means and connected to the drive means.

9. The mechanical joint of claim 8 wherein the sleeve means comprises a first and a second sleeve assembly,
the first sleeve assembly comprising an inner sleeve attached to the first ribbon means, and an outer sleeve rotatable about the inner sleeve, and a rod connected at a first end to the outer sleeve and at a second end to the drive means; and
the second sleeve assembly comprising an inner sleeve attached to the second ribbon means and an outer sleeve rotatable about the inner sleeve, and a rod connected at a first end to the outer sleeve and at a second end to the drive means.

10. A controlled relative motion system permitting a controlled motion member, joined to a base member, to selectively move with respect to that base member, the system comprising:
a first joint means comprising:
a first joint support means;
a first joint ball means of a generally spherical shape affixed to the first joint support means;
a first joint equatorial plane capture means having a rotation location in which the first joint ball means is positioned such that the first joint equatorial plane capture means can rotate in multiple directions about the first joint ball means;
a plurality of first joint force imparting means mechanically connected to the first joint equatorial plane capture means, including a first joint first force imparting means and a first joint second force imparting means, each of which permits force to selectively be imparted to the first joint equatorial plane capture means; and
a plurality of first joint connection means, including a first joint first connection means and a first joint second connection means, with the first joint first connection means rotatably connecting the first joint first force imparting means to the first joint equatorial plane capture means and the first joint second connection means rotatably connecting the first joint second force imparting means to the first joint equatorial plane capture means, the first joint first connection means also being capable of approaching and receding from the first joint second connection means during rotation of the first joint equatorial plane capture means about the first joint ball means.

11. The apparatus of claim 10 wherein the first joint equatorial plane capture means is formed by a first joint socket means having a recess therein ending in a surface at least partially concave following a general hemispherical shape past an equator thereof, there being diametrically opposed slots in the first joint socket means along two portions of the equator which slots open into the first joint socket means recess, the first joint ball means being positioned in the first joint socket means recess and the first joint first connection means being movable along one of the first joint socket means opposed slots.

12. The appartus of claim 11 wherein the plurality of first joint connection means further comprises first joint third and fourth connection means which each rotatably connect selected ones of the plurality of first joint force imparting means to the first joint socket means with the first joint third connection means being movable along that one of the first joint socket means opposed slots opposite the one in which the first joint first connection means is movable.

13. The apparatus of claim 12 wherein the plurality of first joint force imparting means includes a first joint third force imparting means and a first joint fourth force imparting means, and with the first joint third connection means rotatably connecting the first joint third force imparting means to the first joint socket means and the first joint fourth connection means rotatably connecting the first joint fourth force imparting means to the first joint socket means, the first joint first, second, third and fourth force imparting means each being a ribbon means.

14. The apparatus of claim 13 wherein the first joint support means includes a first joint support means frame which is framed about a first joint force imparting means space within which at least a portion of the first joint first, second, third and fourth force imparting ribbon means are positioned.

15. The apparatus of claim 14 wherein the system further comprises a second joint means having a second joint base member and a second joint rotary member which is rotatably connected to the second joint base member such that it can rotate about substantially a single axis with respect to the second joint base member, and further having second joint first and second force imparting ribbon means mechanically connected to the second joint rotary member which permits force to be selectively imparted to the second joint rotary member such that the second joint first force imparting ribbon means in tension causes the second joint rotary member to rotate in one direction and the second joint second force imparting ribbons means in tension causes the second joint rotary member to rotate in the opposite direction, the second joint base member being mechanically connected to the first joint socket means.

16. The apparatus of claim 14 wherein the first joint first, second, third and fourth force imparting ribbon means are mechanically connected to motive means.

17. The apparatus of claim 12 wherein that corresponding one of the first joint socket means opposed slots in which the first joint first connection means is movable has the first joint first connection means extend therein into a first holding means in which it can rotate, which first holding means is affixed to a first bearing means in which it can move parallel to that corresponding opposed slot; that corresponding one of the first joint socket means opposed slots in which the first joint third connection means is movable has the first joint third connection means extending therein into a second holding means in which it can rotate, which second holding means is affixed to a second bearing means in which it can move parallel to that corresponding slot.

18. The apparatus of claim 11 wherein that corresponding one of the first joint socket means opposed slots in which the first joint first connection means is movable has the first joint first connection means extending therein into a first holding means in which it can rotate, which first holding means is affixed to a first bearing means in which it can move parallel to that corresponding slot.

19. The apparatus of claim 11 wherein the recess, past the equator, has an opening to the outside of the first joint socket means such that the recess concave surface part of a generally hemispherical shape is positioned between the equator and the opening.

20. The apparatus of claim 19 wherein the first joint first and second force imparting means, the second joint first and second force imparting means, and the third joint first force imparting means are an extended means, and wherein the second joint support means includes a second joint support means frame which is framed about a second and third joint force imparting means space within which at least a portion of the second joint first and second force imparting extending means and at least a portion of the third joint first force imparting extended means are postioned, and wherein the first joint support means includes a first joint support means frame which is framed about a first, second and third joint force imparting means space within which at least a portion of the first joint first and second force imparting extended means, at least a portion of the second joint first and second force imparting extended means, and at least a portion of the third joint first force imparting extended means are positioned.

21. The apparatus of claim 20 wherein the first joint first and second force imparting extended means, the second joint first and second force imparting extended means, and the third joint first force imparting extended means are mechanically connected to motive means.

22. The apparatus of claim 10 wherein the first joint equatorial plane capture means is formed by a first joint first and second bail means which are rotatably connected to one another between the opposite ends of each, and the first joint first and second connection means are formed by first joint first and second shoe means each having a surface following in the general shape of a circular arc between which the first joint ball means is positioned, the first joint first shoe means being rotatably connected to each of the opposite ends of the first joint first bail means and the first joint second shoe means being rotatably connected to each of the opposite ends of the first joint second bail means.

23. The apparatus of claim 22 wherein the plurality of first joint force imparting means includes a first joint third force imparting means and a first joint fourth force imparting means, and with the first joint first connection means rotatably connecting the first joint third force imparting means to the first joint equatorial plane capture means and the first joint second connection means rotatably connecting the first joint fourth force imparting means to the first joint equatorial plane capture means, the first joint first, second, third and fourth force imparting means each being a ribbon means.

24. The apparatus of claim 23 wherein the first joint support means includes a first joint support means frame which is framed about a first joint force imparting means space within which at least a portion of the first joint first, second, third and fourth force imparting ribbon means are positioned.

25. The apparatus of claim 24 wherein the system further comprises a second joint means mechanically connected to the first joint means, and the second joint means comprising:

a second joint support means mechanically connected to the first joint socket means;

a second joint ball means of a generally spherical shape affixed to the second joint support means;

a second joint socket means having a recess therein ending in a surface at least partially concave following a generally hemispherical shape past an equator thereof, there being diametrically opposed slots in the second joint socket means along two portions of the equator which slots open into the second joint socket means recess, the second joint ball means being positioned in the second joint socket means recess;

a plurality of second joint force imparting means mechanically connected to the second joint socket means, including a second joint first force imparting means and a second joint second force imparting means, each of which permits force to selectively be imparted to the second joint socket means; and a plurality of second joint connection means, including a second joint first connection means and a second joint second connection means, with the second joint first connection means rotatably connecting the second joint first force imparting means to the second joint socket means and the second joint second connection means rotatably connecting the second joint second force imparting means to the second joint socket means, the second joint first connection means being movable along one of the second joint socket means opposed slots.

26. The apparatus of claim 25 wherein the plurality of second joint force imparting means includes a second joint force imparting means and a second joint fourth force imparting means, and the plurality of second joint connection means includes a second joint third connection means and a second joint fourth connection means, and with the second joint third connection means rotatably connecting the second joint third force imparting means to the second joint socket means, and the second joint fourth connection means rotatably connecting the second joint fourth force imparting means to the second joint socket means, and with the second joint third connection means being movable along that one of the second joint socket means opposed slots opposite the one in which the second joint first connection means is movable, the second joint first, second, third and fourth force imparting means each being a ribbon means.

27. The apparatus of claim 26 wherein the first joint support means includes a first joint support means frame which is framed about a first and second joint force imparting means space within which at least a portion of the first joint first, second, third and fourth force imparting ribbon means and the second joint first, second, third and fourth force imparting ribbon means are positioned.

28. The apparatus of claim 27 wherein the first joint first, second, third and fourth force imparting ribbon means and the second joint first, second, third and fourth force imparting ribbon means are mechanically connected to motive means.

29. The apparatus of claim 27 wherein the second joint first, second, third and fourth force imparting ribbon means are arrayed outside the first joint equatorial plane capture means.

30. The apparatus of claim 27 wherein the second joint first, second, third and fourth force imparting ribbon means pass through a passageway provided in the first joint ball means.

31. The apparatus of claim 26 wherein the system further comprises a third joint means having a third joint base member and a third joint rotary member which is rotatably connected to the third joint base member such that it can rotate about substantially a single axis with respect to the third joint base member, and further having third joint first and second force imparting ribbon means mechanically connected to the third joint rotary member which thereby permits force to be selectively imparted to the third joint rotary member such that the third joint first force imparting ribbon means in tension causes the third joint rotary member to rotate in one direction and the third joint second force imparting ribbon means in tension causes the third joint rotary member to rotate in the opposite direction, the third joint base member being mechanically connected to the second joint equatorial plane capture means.

32. The apparatus of claim 31 wherein the second joint support means includes a second joint support means frame which is framed about a second and third joint force imparting means space within which at least a portion of the second joint first, second, third and fourth force imparting ribbon means and at least a portion of the third joint first and second force imparting ribbon means are positioned, and wherein the first joint support means includes a first joint support means frame which is framed about a first, second and third joint force imparting means space within which at least a portion of the first joint first, second, third and fourth force imparting ribbon means, at least a portion of the second joint first, second, third and fourth force imparting ribbon means, and at least a portion of the third joint first and second force imparting ribbon means are positioned.

33. The apparatus of claim 26 wherein the system further comprises:
- a first plurality of joint means, including the first and second joint means, each of the first plurality of joint means comprising:
  a joint support means;
  a joint ball means of a generally spherical shape affixed to the joint support means;
  a joint socket means having a recess thereon ending in a surface at least partially concave following a generally hemispherical shape past an equator thereof, there being diametrically opposed slots in the joint socket means along two portions of the equator which slots open into the joint socket means recess, the corresponding joint ball means being positioned in the joint socket means recess;
  a plurality of joint force imparting means mechanically connected to the joint socket means, including a joint first force imparting means, a joint second force imparting means, a joint third force imparting means and a joint fourth force imparting means, each of which permits force to selectively be imparted to the corresponding joint socket means;
  a plurality of joint connection means, including a joint first connection means, a joint second connection means, a joint third connection means and a joint fourth connection means, with the joint first connection means rotatably connecting the corresponding joint first force imparting means to the corresponding joint socket means, the joint second connection means rotatably connecting the corresponding joint second force imparting means to the corresponding joint socket means, the joint first connection means being movable along one of the joint socket means opposed slots and the joint third connecting means being movable along the opposite joint socket means opposed slot; and
- a mechanical interconnection array mechanically connecting together each of the first plurality of joint means such that the joint support means of each, other than the first joint support means, is connected to the first joint socket means.

34. The apparatus of claim 33 wherein the joint support means of each of the first plurality of joint means, other than the first joint support means, are connected together in one rigid body, and the system further comprises a third joint means mechanically connected to the first joint socket means, the third joint means comprising:
  a third joint support means;
  a third joint ball means of a generally spherical shape affixed to the third joint support means;
  a third joint socket means having a recess thereon ending in a surface at least partially concave following a generally hemispherical shape past an equator thereof, there being diametrically opposed slots in the third joint socket means along two portions of the equator which slot opens into the third joint socket means recess, the corresponding joint ball means being positioned in the joint socket means recess;
  a plurality of third joint force imparting means mechanically connected to the third joint socket means, including a third joint first force imparting means, a third joint second force imparting means, a third joint third force imparting means and a third joint fourth force imparting means, each of which permits force to selectively be imparted to the third joint socket means;
  a plurality of third joint connection means, including a third joint first connection means, a third joint second connection means, a third joint third connection means and a third joint fourth connection means, with the third joint first connection means rotatably connecting the third joint first force imparting means to the joint socket means, the third joint second connection means rotatably connecting the third joint second force imparting means to the third joint socket means, the third joint third connection means rotatably connecting the third joint third force imparting means to the third joint socket means, and the third joint fourth connection means rotatably connecting the third joint fourth force imparting means to the third joint socket means, the third joint first connection means being movable along one of the third joint socket means opposed slots and the third joint third connection means being movable along the opposite third joint socket means opposed slot;
  and wherein the system further comprises a second plurality of joint means, each of the second plurality of joint means comprising:

a plurality of joint base members one of which is mechanically connected to the third joint socket means and the others of which are each mechanically connected to one of the joint socket means of the first plurality of joint means other than the first joint socket means;

a plurality of rotary members each of which is rotatably connected to one of the joint base members such that it can rotate about substantially a single axis with respect to the corresponding joint base member; and a plurality of joint first force imparting means and a plurality of joint second force imparting means, each of the joint first force imparting means being paired with one of the joint second force imparting means with each such pair being mechanically connected to a corresponding joint rotary member which thereby permits force to be selectively imparted to such corresponding joint rotary member such that the joint first force imparting means of the pair causes the joint rotary member to rotate in one direction and the joint second force imparting means of the pair causes the joint rotary member to rotate in the opposite direction.

35. The apparatus of claim 24 wherein the first joint first, second, third and fourth force imparting ribbon means are mechanically connected to motive means.

36. The apparatus of claim 35 wherein the first joint support means includes a first joint support means frame which is framed about a first and second joint force imparting means space within which at least a portion of the first joint first, second, third and fourth force imparting ribbon means and at least a portion of the second joint first and second force imparting ribbon means are positioned.

37. The apparatus of claim 36 wherein the first joint first, second, third and fourth force imparting ribbon means and the second joint first and second force imparting ribbon means are mechanically connected to motive means.

38. The apparatus of claim 23 wherein the first joint ball means has first and second grooves formed therein along those intersections where planes at 90° from one another pass through the center of the first joint ball means to intersect the surface of the first joint ball means, and with the first joint first shoe means surface following the general shape of a circular arc positioned in the first joint first ball means first groove and with the first joint second shoe means surface following the general shape of a circular arc positioned in the first joint ball means second groove.

39. The apparatus of claim 10 wherein the system further comprises a second joint means mechanically connected to the first joint means, the second joint means comprising:

a second joint support means;

a second joint ball means of a generally spherical shape affixed to the second joint support means;

a second joint equatorial plane capture means having a rotation location in which the second joint ball means is positioned such that the second joint equatorial plane capture means can rotate in multiple directions about the second joint ball means;

a plurality of second joint force imparting means mechanically connected to the second joint equatorial plane capture means, including a second joint first force imparting means and a second joint second force imparting means, each of which permits force to selectively be imparted to the second joint equatorial plane capture means; and a plurality of second joint connection means, including a second joint first connection means and a second joint second connection means, with the second joint first connection means rotatably connecting the second joint first force imparting means to the second joint equatorial plane capture means and the second joint second connection means rotatably connecting the second joint second force imparting means to the second joint equatorial plane capture means, the second joint first connection means also being capable of approaching and receding from the second joint second connection means during rotation of the second joint equatorial plane capture means about the second joint ball means.

40. The apparatus of claim 39 wherein the second joint support means is mechanically connected to the first joint equatorial plane capture means.

41. The apparatus of claim 40 wherein the system further comprises:

a first plurality of joint means, including the first and second joint means, each of the first plurality of joint means comprising:

a joint support means;

a joint ball means of a generally spherical shape affixed to the joint support means;

a joint equatorial plane capture means having a rotation location in which the corresponding joint ball means is positioned such that the joint equatorial plane capture means can rotate in multiple directions about that joint ball means;

a plurality of joint force imparting means mechanically connected to the equatorial plane capture means, including a joint first force imparting means and a joint second force imparting means, each of which permits force to selectively be imparted to the corresponding joint equatorial plane capture means;

a plurality of joint connection means, including a joint first connection means and a joint second connection means, with the joint first connection means rotatably connecting the corresponding joint first force imparting means to the corresponding joint equatorial plane capture means and the joint second connection means rotatably connecting the corresponding joint second force imparting means to the corresponding joint equatorial plane capture means, the joint first connection means also being capable of approaching and receding from the joint second connection means during rotation of the corresponding joint equatorial plane capture means about the corresponding joint ball means; and a mechanical interconnection sequence mechanically connecting together each of the first plurality of joint means such that the joint suppot means of one is connected to the joint equatorial plane capture means of another except for the first joint support means and the joint equatorial plane capture means of that one of the first plurality of joint means at the opposite end of the mechanical interconnection sequence.

42. The apparatus of claim 41 wherein the system further comprises:

a second plurality of joint means, each of the second plurality of joint means comprising:

a joint support means;

a joint ball means of a generally spherical shape affixed to the joint support means;

a joint equatorial plane capture means having a rotation location in which the corresponding joint ball means is positioned such that the joint equatorial plane capture means can rotate in multiple directions about that joint ball means;

a plurality of joint force imparting means mechanically connected to the equatorial plane capture means, including a joint first force imparting means and a joint second force imparting means, each of which permits force to selectively be imparted to the corresponding joint equatorial plane capture means;

a plurality of joint connection means, including a joint first connection means and a joint second connection means, with the joint first connection means rotatably connecting the corresponding joint first force imparting means to the corresponding joint equatorial plane capture means and the joint second connection means rotatably connecting the corresponding joint second force imparting means to the corresponding joint equatorial plane capture means, the joint first connection means also being capable of approaching and receding from the joint second connection means during rotation of the corresponding joint equatorial plane capture means about the corresponding joint ball means; and a mechanical interconnection array mechanically connecting together each of the second plurality of joint means such that the joint support means of each is connected to the first joint equatorial plane capture means.

43. The apparatus of claim 40 wherein the system further comprises a third joint means having a third joint base member and a third joint rotary member which is rotatably connected to the third joint base member such that it can rotate about substantially a single axis with respect to the third joint base member, and further having a third joint first force imparting means mechanically connected to the third joint rotary member which permits force to be selectively imparted to the third joint rotary member, the third joint base member being mechanically connected to the second joint equatorial plane capture means.

44. The apparatus of claim 40 wherein the system further comprises:

a first plurality of joint means, including the first and second joint means, each of the first plurality of joint means comprising:

a joint support means;

a joint ball means of a generally spherical shape affixed to the joint support means;

a joint equatorial plane capture means having a rotation location in which the corresponding joint ball means is positioned such that the joint equatorial plane capture means can rotate in multiple directions about that joint ball means;

a plurality of joint force imparting means mechanically connected to the equatorial plane capture means, including a joint first force imparting means and a joint second force imparting means, each of which permits force to selectively be imparted to the corresponding joint equatorial plane capture means;

a plurality of joint connection means, including a joint first connection means and a joint second connection means, with the joint first connection means rotatably connecting the corresponding joint first force imparting means to the corresponding joint equatorial plane capture means and the joint second connection means rotatably connecting the corresponding joint second force imparting means to the corresponding joint equatorial plane capture means, the joint first connection means also being capable of approaching and receding from the joint second connection means during rotation of the corresponding joint equatorial plane capture means about the corresponding joint ball means; and a mechanical interconnection array mechanically connecting together each of the first plurality of joint means such that the joint support means of each, other than the first joint support means, is connected to the first joint equatorial plane capture means.

45. The apparatus of claim 44 wherein the system further comprises:

a second plurality of joint means, each of the plurality of joint means comprising:

a joint suport means;

a joint ball means of a generally spherical shape affixed to the joint support means;

a joint equatorial plane capture means having a rotation location in which the corresponding joint ball means is positioned such that the joint equatorial plane capture means can rotate in multiple directions about that joint ball means;

a plurality of joint force imparting means mechanically connected to the equatorial plane capture means, including a joint first force imparting means and a joint second force imparting means, each of which permits force to selectively be imparted to the corresponding joint equatorial plane capture means;

a plurality of joint connection means, including a joint first connection means and a joint second connection means, with the joint first connection means rotatably connecting the corresponding joint first force imparting means to the corresponding joint equatorial plane capture means and the joint second connection means rotatably connecting the corresponding joint second force imparting means to the corresponding joint equatorial plane capture means, the joint first connection means also being capable of approaching and receding from the joint second connection means during rotation of the corresponding joint equatorial plane capture means about the corresponding joint ball means; and a mechanical interconnection sequence mechanically connecting together each of the second plurality of joint means such that the joint support means of one is connected to the joint equatorial plane capture means of another except for the joint support means and the joint equatorial plane capture means at the opposite end of the mechanical interconnection sequence, this joint support means at one end of the mechanical interconnection sequence being mechanically connected to a joint equatorial plane capture means at one of the first plurality of joint means other than the first joint means.

46. The apparatus of claim 44 wherein the joint support means of each of the first plurality of joint means, other than the first joint support means, are connected together in one rigid body, and the system further comprises a third joint means mechanically connected to the first joint equatorial plane capture means, the third joint means comprising:
- a third joint support means;
- a third joint ball means of a generally spherical shape affixed to the third joint support means;
- a third joint equatorial plane capture means having a rotation location in which the third joint ball means is positioned such that the third joint equatorail plane capture means can rotate in multiple directions about the third joint ball means;
- a plurality of third joint force imparting means mechanically connected to the third joint equatorial plane capture means, including a third joint first force imparting means and a third joint second force imparting means, each of which permits force to be selectively imparted to the third joint equatorial plane capture means; and
- a plurality of third joint connection means, including a third joint first connection means and a third joint second connection means, with the third joint first connection means rotatably connecting the third joint first force imparting means to the third joint equatorial plane capture means, and the third joint second connection means rotatably connecting the third joint second force imparting means to the third joint equatorial plane capture means, the third joint first connection means also being capable of approaching and receding from the third joint second connection means during rotation of the third joint equatorial plane capture means about the third joint ball means.

47. The apparatus of claim 46 wherein the system further comprises a second plurality of joint means, each of the second plurality of joint means comprising:
- a plurality of joint base members one of which is mechanically connected to the third joint equatorial plane capture means and the others of which are each mechanically connected to one of the joint equatorial plane capture means of the first plurality of joint means other than the first joint equatorial plane capture means;
- a plurality of rotary members each of which is rotatably connected to one of the joint base members such that it can rotate about substantially a single axis with respect to the corresponding joint base member; and
- a plurality of joint first force imparting means, each of which is mechanically connected to a corresponding joint rotary member which thereby permits force to be selectively imparted to such corresponding joint rotary member.

48. The apparatus of claim 47 wherein the first plurality of joint means, other than the first joint support means, in being connected together in the rigid body, are four in number, and the rigid body is positioned with respect the first joint means in a manner similar to the positioning of the human palm with respect to a human wrist, and the first plurality of joint means other than the first joint means are positioned with respect to the rigid body in a manner similar to the positioning of human knuckles with respect to a human palm, and the second plurality of joint means are positioned with respect to the first plurality of joint means in a manner similar to the positioning of intermediate human finger knuckles with respect to human finger base knuckles, there being a third plurality of joint means comprising:
- a plurality of joint base members each of which is mechanically connected to one of the rotary members of the second plurality of joint means;
- a plurality of rotary members each of which is rotatably connected to one of the joint base members of this second plurality of joint means such that it can rotate about substantially a single axis with respect to the corresponding joint base member; and
- a plurality of joint first force imparting means, each of which is mechanically connected to a corresponding joint rotary member of this second plurality of joint means which thereby permits force to be selectively imparted to such corresponding joint rotary member.

49. The apparatus of claim 40 wherein the plurality of first joint force imparting means includes a first joint third force imparting means and a first joint fourth force imparting means, and the plurality of first joint connection means includes a first joint third connection means and a first joint fourth connection means, and with the first joint third connection means rotatably connecting the first joint third force imparting means to the first joint equatorial plane capture means and the first joint fourth connection means rotatably connecting the first joint fourth force imparting means to the first joint equatorial plane capture means, the first joint first, second, third and fourth force imparting means each being an extended means, and wherein the plurality of second joint force imparting means includes second joint third force imparting means and a third joint fourth force imparting means, and the plurality of second joint connection means including a second joint third connection means and a second joint fourth connection means, and with the second joint third connection means rotatably connecting the second joint third force imparting means to the second joint equatorial plane capture means and the second joint fourth connection means rotatably connecting the second joint fourth force imparting means to the second joint equatorial plane capture means, the second joint first, second, third and fourth force imparting means each being an extended means.

50. The apparatus of claim 49 wherein the first joint support means includes a first and second joint support means frame which is framed about a first joint force imparting means space within which at least a portion of the first joint first, second, third and fourth force imparting extended means and at least a portion of the second joint first, second, third and fourth force imparting extended means are positioned.

51. The apparatus of claim 50 wherein the first joint first, second, third and fourth force imparting extended means and the second joint first, second, third and fourth force imparting extended means are mechanically connected to motive means.

52. The apparatus of claim 50 wherein the second joint first, second, third and fourth force imparting extended means are arrayed outside the first joint equatorial plane capture means.

53. The apparatus of claim 50 wherein the second joint first, second, third and fourth force imparting extended means pass through a passageway provided in the first joint ball means.

54. The apparatus of claim 39 wherein the first and second joint support means are mechanically connected to one another.

55. The apparatus of claim 54 wherein the plurality of first joint force imparting means includes a first joint third force imparting means and a first joint fourth force imparting means, and the plurality of first joint connection means includes a first joint third connection means and a first joint fourth connection means, and with the first joint third connection means rotatably connecting the first joint third force imparting means to the first joint equatorial plane capture means and the first joint fourth connection means rotatably connecting the first joint fourth force imparting means to the first joint equatorial plane capture means, the first joint first, second, third and fourth force imparting means each being an extended means, and wherein the plurality of second joint force imparting means includes second joint third force imparting means and a third joint fourth force imparting means, and the plurality of second joint connection means including a second joint third connection means and a second joint fourth connection means, and with the second joint third connection means rotatably connecting the second joint third force imparting means to the second joint equatorial plane capture means and the second joint fourth connection means rotatably connecting the second joint fourth force imparting means to the second joint equatorial plane capture means, the second joint first, second, third and fourth force imparting means each being an extended means.

56. The apparatus of claim 55 wherein the first joint support means includes a first joint support means frame and the second joint support means includes a second joint support means frame which together are framed about a first and second joint force imparting means space within which at least a portion of the first joint first, second, third and fourth force imparting extended means and at least a portion of the second joint first, second, third and fourth force imparting extended means are positioned.

57. The apparatus of claim 56 wherein the first joint first, second, third and fourth force imparting extended means and the second joint first, second, third and fourth force imparting extended means are mechanically connected to motive means.

58. The apparatus of claim 10 wherein the system further comprises a second joint means having a second joint base member and a second joint rotary member which is rotatably connected to the second joint base member such that it can rotate about substantially a single axis with respect to the second joint base member, and further having a second joint first force imparting means mechanically connected to the second joint rotary member which permits force to be selectively imparted to the second joint rotary member, the second joint base member being mechanically connected to the first joint equatorial plane capture means.

59. The apparatus of claim 58 wherein the first joint first and second force imparting means and the second joint first force imparting means are each a ribbon means, and wherein the first joint support means includes a first joint support means frame which is framed about a first and second joint force imparting means space within which at least a portion of the first joint first and second force imparting ribbon means and at least a portion of the second joint first force imparting ribbon means are positioned.

60. The apparatus of claim 59 wherein the first joint first and second force imparting ribbon means and the second joint force imparting ribbon means are mechanically connected to motive means.

61. The controlled relative motion system permitting a controlled motion member, joined to a base member, to selectively move with respect to that base member, the system comprising:
 a first joint means comprising:
 a first joint support means;
 a first joint ball means of a generally spherical shape affixed to the first joint support means;
 a first joint equatorial plane capture means having a rotation location in which the first joint ball means is positioned such that the first joint equatorial plane capture means can rotate in multiple directions about the first joint ball means;
 a plurality of first joint force imparting means mechanically connected to the first joint equatorial plane capture means, including a first joint first force imparting means and a first joint second force imparting means, each of which permits force to selectively be imparted to the first joint equatorial plane capture means; and
 a first joint pin means extending into the first joint equatorial plane capture means and into a groove formed within the first joint ball means.

62. The apparatus of claim 16 wherein the first joint means further comprises a plurality of first joint connection means, including a first joint first connection means and a first joint second connection means, with the first joint first connection means rotatably connectint the first joint first force imparting means to the first joint equatorial plane capture means, and the first joint second connection means rotatably connecting the first joint second force imparting means to the first joint equatorial plane capture means, the first joint first connection means also being capable of approaching and receding from the first joint second connection means during rotation of the first joint equatorial plane capture means about the first joint ball means, and wherein the first joint equatorial plane capture means is formed by a first joint socket means having a recess therein ending in a surface at least partially concave following a generally hemispherical shape past an equator thereof, there being diametrically opposed slots in the first joint socket means along two portions of the equator which slots open into the first joint sockets means recess, the first joint ball means being positioned in the first joint socket means recess, the first joint first connection means being movable along one of the first joint socket means opposed slots, and with said first joint pin means serving as said first joint second connection means.

63. The apparatus of claim 61 wherein the system further comprises a second joint means mechanically connected to the first joint means, the second joint means comprising:
 a second joint support means;
 a second joint ball means of a generally spherical shape affixed to the second joint support means;
 a second joint equatorial plane capture means having a rotation location in which the second joint ball means is positioned such that the second joint equatorial plane capture means can rotate in multiple directions about the second joint ball means;
 a plurality of second joint force imparting means mechanically connected to the second joint equatorial plane capture means, including a second joint first force imparting means and a second joint second force imparting means, each of which permits force to selectively be imparted to the second joint equatorial plane capture means; and a second joint pin means extending into the second joint equatorial plane capture means and into a groove formed within the second joint ball means.

64. The apparatus of claim 61 wherein the system further comprises a second joint means having a second joint base member and a second joint rotary member which is rotatably connected to the second joint base member such that it can rotate about substantially a single axis with respect to the second joint base member, and further having a second joint first force imparting means mechanically connected to the second joint rotary member which permits force to be selectively imparted to the second joint rotary member, the second joint base member being mechanically connected to the first joint equatorial plane capture means.

65. A controlled relative motion system permitting a controlled motion member, joined to a base member, to selectively move with respect to that base member, the system comprising:
   a first joint means comprising:
   a first joint ball means of a generally spherical shape;
   a first joint equatorial plane capture means having a rotation location in which the first joint ball means is positioned such that the first joint ball means can rotate in multiple directions within the first joint equatorial plane capture means;
   a first joint support means affixed to the first joint equatorial plane capture means;
   a plurality of first joint force imparting means mechanically connected to the first joint force means, including a first joint first force imparting means and a first joint second force imparting means, each of which permits force to selectively be imparted to the first ball means; and
   a plurality of first joint connection means, including a first joint first connection means and a first joint second connection means, with the first joint first connection means rotatably connecting the first joint first force imparting means to the first joint ball means and the first joint second connection means rotatably connecting the first joint second force imparting means to the first joint equatorial plane capture means, the first joint first connection means also being capable of approaching and receding from the first joint second connection means during rotation of the first joint ball means within the first joint equatorial plane capture means.

66. The apparatus of claim 65 wherein the first joint equatorial plane capture means is formed by a first joint socket means having a recess therein ending in a surface at least partially concave following a generally hemispherical shape past an equator thereof, there being diametrically opposed slots in the first joint ball means along two portions of an equator thereof, the first joint ball means being positioned in the first joint socket means recess, the first joint first connection means being movable along one of the first joint ball means opposed slots.

67. The appartus of claim 65 wherein the plurality of first joint connection means further comprises first joint third and fourth connection means which each rotatably connect selected ones of the plurality of first joint force imparting means to the first joint ball means with the first joint third connection means being movable along that one of the first joint ball means opposed slots opposite the one in which the first joint first connection means is movable.

68. The apparatus of claim 67 wherein the plurality of first joint force imparting means includes a first joint third force imparting means and a first joint fourth force imparting means, and with the first joint third connection means rotatably connecting the first joint third force imparting means to the first joint ball means and the first joint fourth connection means rotatably connecting the first joint fourth force imparting means to the first joint ball means, the first joint first, second, third and fourth force imparting means each being a ribbon means.

69. The apparatus of claim 68 wherein the first joint support means includes a first joint support means frame which is framed about a first joint force imparting means space within which at least a portion of the first joint first, second, third and fourth force imparting ribbon means are positioned.

70. The apparatus of claim 69 wherein the first joint first, second, third and fourth force imparting ribbon means are mechanically connected to motive means.

* * * * *

UNITED STATES PATENT AND TRADEMARK OFFICE
CERTIFICATE OF CORRECTION

PATENT NO. : 4,804,220
DATED : February 14, 1989
INVENTOR(S) : Mark E. Rosheim

It is certified that error appears in the above-identified patent and that said Letters Patent is hereby corrected as shown below:

Column 16, line 6, delete "and"

Column 20, line 58, delete "suppot" and insert "support"

Column 23, line 13, delete "equatorail" and insert "equatorial"

Column 26, line 1, delete "The" and insert "A"

Column 26, line 24, delete "16" and insert "61"

Column 26, line 28, delete "connectint" and insert "connecting"

Signed and Sealed this

Twelfth Day of September, 1989

Attest:

DONALD J. QUIGG

Attesting Officer

Commissioner of Patents and Trademarks